US009497435B2

(12) United States Patent
Georgakis et al.

(10) Patent No.: US 9,497,435 B2
(45) Date of Patent: Nov. 15, 2016

(54) ENCODER, METHOD IN AN ENCODER, DECODER AND METHOD IN A DECODER FOR PROVIDING INFORMATION CONCERNING A SPATIAL VALIDITY RANGE

(75) Inventors: Apostolos Georgakis, Stockholm (SE); Andrey Norkin, Solna (SE); Thomas Rusert, Kista (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 277 days.

(21) Appl. No.: 14/238,482

(22) PCT Filed: May 24, 2012

(86) PCT No.: PCT/SE2012/050556
§ 371 (c)(1),
(2), (4) Date: Feb. 12, 2014

(87) PCT Pub. No.: WO2013/025149
PCT Pub. Date: Feb. 21, 2013

(65) Prior Publication Data
US 2014/0192148 A1 Jul. 10, 2014

Related U.S. Application Data

(60) Provisional application No. 61/523,559, filed on Aug. 15, 2011.

(51) Int. Cl.
*H04N 19/46* (2014.01)
*H04N 13/00* (2006.01)
(Continued)

(52) U.S. Cl.
CPC ...... *H04N 13/0011* (2013.01); *H04N 13/0022* (2013.01); *H04N 13/0048* (2013.01);
(Continued)

(58) Field of Classification Search
CPC .............. H04N 19/0066; H04N 19/423; H04N 19/82; H04N 19/86
(Continued)

(56) References Cited

U.S. PATENT DOCUMENTS 8,345,751 B2    1/2013 Klein Gunnewiek
2011/0292044 A1* 12/2011 Kim ................... H04N 13/0011
345/419

(Continued)

FOREIGN PATENT DOCUMENTS

WO    2009125988 A2    10/2009
WO    2010141927 A1    12/2010
WO    2011049519 A1    4/2011

OTHER PUBLICATIONS

Inamoto, Naho, et al. "Free Viewpoint Video Synthesis and Presentation from Multiple Sporting Videos." Electronics and Communications in Japan. Part 3, vol. 90, No. 2. 2007. 40-49.

(Continued)

*Primary Examiner* — William C Vaughn, Jr.
*Assistant Examiner* — Jae N Noh
(74) *Attorney, Agent, or Firm* — Murphy, Bilak & Homiller, PLLC

(57) ABSTRACT

Methods (700, 900) for providing information from an encoder (220) to a decoder (230) concerning a spatial validity range, at which view synthesis of an image at a virtual camera position can be performed with sufficient visual quality, based on a view of at least one real camera (210-1) comprised in a set of real cameras (210-1, 210-2, 210-3, 210-4). The methods (700, 900) comprises determining (701) the spatial validity range of the at least one real camera (210-1), which spatial validity range specifies for the decoder (230) what information to use for synthesizing the image of the virtual camera position. Also, the determined (Continued)

(701) spatial validity range is transmitted (706) to the decoder (230).

30 Claims, 12 Drawing Sheets

(51) Int. Cl.
*H04N 19/597* (2014.01)
*H04N 19/70* (2014.01)
*H04N 13/02* (2006.01)
*H04N 19/553* (2014.01)

(52) U.S. Cl.
CPC .......... *H04N 13/0066* (2013.01); *H04N 19/46* (2014.11); *H04N 19/597* (2014.11); *H04N 19/70* (2014.11); *H04N 13/0242* (2013.01); *H04N 19/553* (2014.11)

(58) Field of Classification Search
USPC .................................................... 375/240.01
See application file for complete search history.

(56) References Cited

U.S. PATENT DOCUMENTS

2012/0069146 A1* 3/2012 Lee ................... H04N 13/0048
348/43
2012/0229602 A1* 9/2012 Chen ................... H04N 19/597
348/43
2013/0278727 A1* 10/2013 Tamir ................. H04N 13/0048
348/47

OTHER PUBLICATIONS

Norkin, Andrey, et al. "View synthesis range signaling." International Organisation for Standardisation. ISO/IEC JTC1/SC29/WG11. Coding of Moving Pictures and Audio. Geneva, Switzerland. May 2012. 1-9.

Smolic, Aljoscha, et al. "Development of a new MPEG Standard for Advanced 3D Video Applications." Proceedings of the 6th International Symposium on Image and Signal Processing and Analysis. 2009. 400-407.

Yea, Sehoon, et al. "Revised syntax for SEI message on multiview acquisition information." Joint Video Team (JVT) of ISO/IEC MPEG & ITU-T VCEG. JVT-Z038r1. 26th Meeting. Antalya, TR. Jun. 13-18, 2008.

Zhang, Liang. "Stereoscopic Image Generation Based on Depth Images." 2004 International Conference on Image Processing (ICIP). IEEE 2004. 2993-2996.

Unknown, Author, "Call for Proposals on 3D Video Coding Technology." International Organisation for Standardisation. ISO/IETC JTC1/SC29/WG11. Coding of Moving Pictures and Audio. Geneva, Switzerland. Mar. 2011. 1-20.

Unknown, Author, "Information Technology—Coding of Audio-Visual Objects—Part 10: Advanced Video Coding." International Standard. ISO/IEC 14496-10. 2010. 1-704.

* cited by examiner

ENCODER, METHOD IN AN ENCODER, DECODER AND METHOD IN A DECODER FOR PROVIDING INFORMATION CONCERNING A SPATIAL VALIDITY RANGE

TECHNICAL FIELD

Implementations described herein relate generally to an encoder, a method in an encoder, a decoder and a method in a decoder. In particular is herein described a mechanism for indicating to a decoder what spatial validity range to use for view synthesis of an image at a virtual camera position.

BACKGROUND

The area of three-dimensional (3D) video, also referred to as 3DTV, is gaining momentum and is touted as the next logical step in consumer electronics, mobile devices, computers and the movies. The additional dimension on top of 2D video offers multiple different directions for displaying the content and improves the potential for interaction between viewers and the content.

The content may be viewed using glasses (anaglyphic, polarized and shutter) or without glassed using auto-stereoscopic displays. In case of a 2-view autostereoscopic display, two slightly different images are shown to the user using a display with a specific optical system such as lenticular lenses or parallax barrier. The viewer needs to position herself in a specific location in front of the device so that different images arrive on her left and right eye respectively (angular cone). An extension to the auto-stereoscopic display is the n-view auto-stereoscopic displays where multiple viewers may experience the stereo effect without glasses.

The benefits of 3D video come with extra costs for content production, distribution and management. Firstly, the producer needs to record from additional sources which increases the information for compression, transport (wired or wireless) and storage (file servers, disks, etc). Additionally there are physical limitation on how many video sources (views) may be captured. Usually the number of cameras, or set of cameras, is 2 or 3 although there are cases where bigger camera rigs have been built (e.g. up to 80).

Moreover, there are two forms of interaction: Case 1) pre-defined number of existing views (finite number), or Case 2) an arbitrary view (infinite). Case 1 exhibits a jitter effect when we move from one viewing angle to another. This is alleviated in case 2 thanks to synthesis with interpolated or extrapolation of available views.

Among the view synthesis techniques, Depth Image Based Rendering (DIBR) has a prominent position. DIBR typically uses two views and their corresponding depth maps. A depth map contains information regarding the distance of objects from the camera and allows for realistic view warping from an existing position into a new one.

Any system with view synthesis capabilities that relies on a DIBR requires n views (textures) and m depth maps. Usually n=m≥2. Due to that constraint it is evident that the bit-rate for 3DTV is higher than 2D TV. To quantify the added cost we need to take into consideration the resolution of the depth maps (usually similar to the resolution of texture) and their spatial and temporal characteristics.

In FIG. 1, two views are used to synthesise a new one. If the synthesised view resulted only from warping the left view then the two grey areas next to the objects are domains where there is lack of information, also referred to as dis-occlusion. In this case the right view is used to fill-in the missing details.

For various reasons the number of input views available for 3DTV needs to be limited. Moreover, in order to achieve the compression ratio mentioned earlier temporal and spatial redundancies between the textures and depths respectively needs to be removed. This may be achieved in various ways. Multiview Video Coding (MVC) for example is capable of reducing spatio-temporal and also in-between views redundancies. But some of the redundancies are difficult to be eliminated. For example, from FIG. 1, the only part strictly necessary from the right view is the dis-occlusion area.

MVC and image+depth formats such as Multiview plus Depth (MVD) do not really address the issue of dis-occlusions directly. These systems are designed with data compression in mind from multiple views. They are not designed to directly reduce redundancies by detecting dis-occlusions.

A solution to data redundancy comes from Layered Depth Video (LDV) that uses multiple layers for scene representation. The layers are: texture, depth, dis-occlusion texture and dis-occlusion depth. In LDV, the way the layers are created can give rise to the cardboard effect where different objects in the scene give the impression of being flat and there are arbitrary transitions in their edges. Similarly with MVC and MVD, the depth discontinuities between foreground and background distort the objects and their background in synthesised views.

There are some variants of LDV, such as described in WO 2009/001255 A1, the amount of data may be reduced by filtering out redundant parts of the dis-occlusion map. But in that case the dis-occlusion map is difficult to be estimated and is anchored to the central view thus making synthesis of adjacent views problematic. Moreover distortions in discontinuity areas are still present.

An extension to LDV is the Depth Enhanced Stereo (DES) which is two LDV streams for left and right view. DES has increased bitrate over LDV and added complexity due to the layered nature.

Another approach is the LDV plus right view which provides additional dis-occlusion information but at the cost of redundant information on top of LDV and additional complexity.

Existing solutions for synthesising images at the decoder side have serious drawbacks, when it comes to quality of certain image parts at the particular virtual camera positions. Thus it is desired to find a way to improve the quality of synthesised images at the decoder side.

SUMMARY

There may exist multiple configurations of 3D video coding systems combining video textures and corresponding depth maps, occlusion texture and occlusion depth maps. An open question is the following. Given a particular camera position, the view synthesis may be performed by using a particular view (or views), its depth-maps and the corresponding video information. How may the decoder, or view renderer/synthesiser, know what information, such as textures, depth maps, occlusion maps and occlusion depth, it may use for view synthesis at a particular camera position?

It is an object to obviate at least some of the above mentioned disadvantages and to improve the performance of an encoder and a decoder, respectively, enhancing image synthesising.

According to a first aspect, the object is achieved by a method in an encoder for providing information to a decoder concerning a spatial validity range, at which view synthesis of an image at a virtual camera position is enabled, based on a view of at least one real camera comprised in a set of real cameras. Thereby an acceptable image quality, i.e. an image quality above a threshold level may be achieved. The method comprises determining the spatial validity range of the at least one real camera. The spatial validity range specifies for the decoder what information to use for synthesising the image of the virtual camera position, and transmitting the determined spatial validity range to the decoder.

According to a second aspect, the object is achieved by an encoder for providing information to a decoder concerning a spatial validity range, at which view synthesis of an image at a virtual camera position is enabled, based on a view of at least one real camera comprised in a set of real cameras. Thereby an acceptable image quality, i.e. an image quality above a threshold level may be achieved. The encoder comprises a processing circuit, configured for determining a spatial validity range of the at least one real camera. The spatial validity range specifies for the decoder what information to use for synthesising the image of the virtual camera position: The encoder also comprises an output section, configured for transmitting the determined spatial validity range to the decoder.

According to a third aspect, the object is achieved by a method in a decoder for receiving information from an encoder concerning a spatial validity range, at which view synthesis of an image at a virtual camera position is enabled, based on a view of at least one real camera comprised in a set of real cameras. Thereby an acceptable image quality, i.e. an image quality above a threshold level may be achieved. The method comprises receiving a spatial validity range of the at least one real camera from the encoder. The spatial validity range specifies for the decoder what information to use for synthesising the image of the virtual camera position. Furthermore, the method comprises selecting the virtual camera position. Additionally, the method comprises determining that the selected virtual camera position is situated within the received spatial validity range.

According to a fourth aspect, the object is achieved by a decoder for receiving information from an encoder concerning a spatial validity range, at which view synthesis of an image at a virtual camera position is enabled, based on a view of at least one real camera comprised in a set of real cameras. Thereby an acceptable image quality, i.e. an image quality above a threshold level may be achieved. The decoder comprises an input section, configured for receiving a spatial validity range of the at least one real camera from the encoder, which spatial validity range specifies for the decoder what information to use for synthesising the image of the virtual camera position. Furthermore, the decoder comprises a processing circuit, configured for selecting the virtual camera position, and also configured for determining that the selected virtual camera position is situated within the received spatial validity range.

Some advantages according to embodiments herein comprises informing the decoder at which virtual camera positions it is feasible to perform view synthesis and which data are needed for such operation. Thereby, the decoder is informed about which spatial validity range that is associated with image data of a certain camera. Based on that information, the decoder is enabled to decide which data segments it may download for a given view synthesis operation. Thereby a reduced complexity in the decoder side is achieved, while achieving a better utilization of the transport stream. Further the decoder, thanks to embodiments herein, is enabled to avoid view synthesis at the camera positions, where the view synthesis would result in poor quality, because they are outside the spatial validity range. Thus an improved performance within an encoder and a decoder is provided, enhancing image synthesising.

Other objects, advantages and novel features of the encoder, the decoder and the methods therein will become apparent from the following detailed description.

BRIEF DESCRIPTION OF THE DRAWINGS

The encoder, the decoder and the respective methods therein are described in more detail with reference to attached drawings illustrating examples of embodiments in which.

DETAILED DESCRIPTION

Embodiments herein are defined as an encoder, a method in an encoder, a decoder and a method in a decoder, which may be put into practice in the embodiments described below. These embodiments may, however, be exemplified and realised in many different forms and are not to be considered as limited to the embodiments set forth herein; rather, these embodiments are provided so that this disclosure will be thorough and complete.

Still other objects and features may become apparent from the following detailed description considered in conjunction with the accompanying drawings. It is to be understood, however, that the drawings are designed solely for purposes of illustration and not as a definition of the limits of the herein disclosed embodiments, for which reference is to be made to the appended claims. It is further to be understood that the drawings are not necessarily drawn to scale and that, unless otherwise indicated, they are merely intended to conceptually illustrate the structures and procedures described herein.

Figure 1:
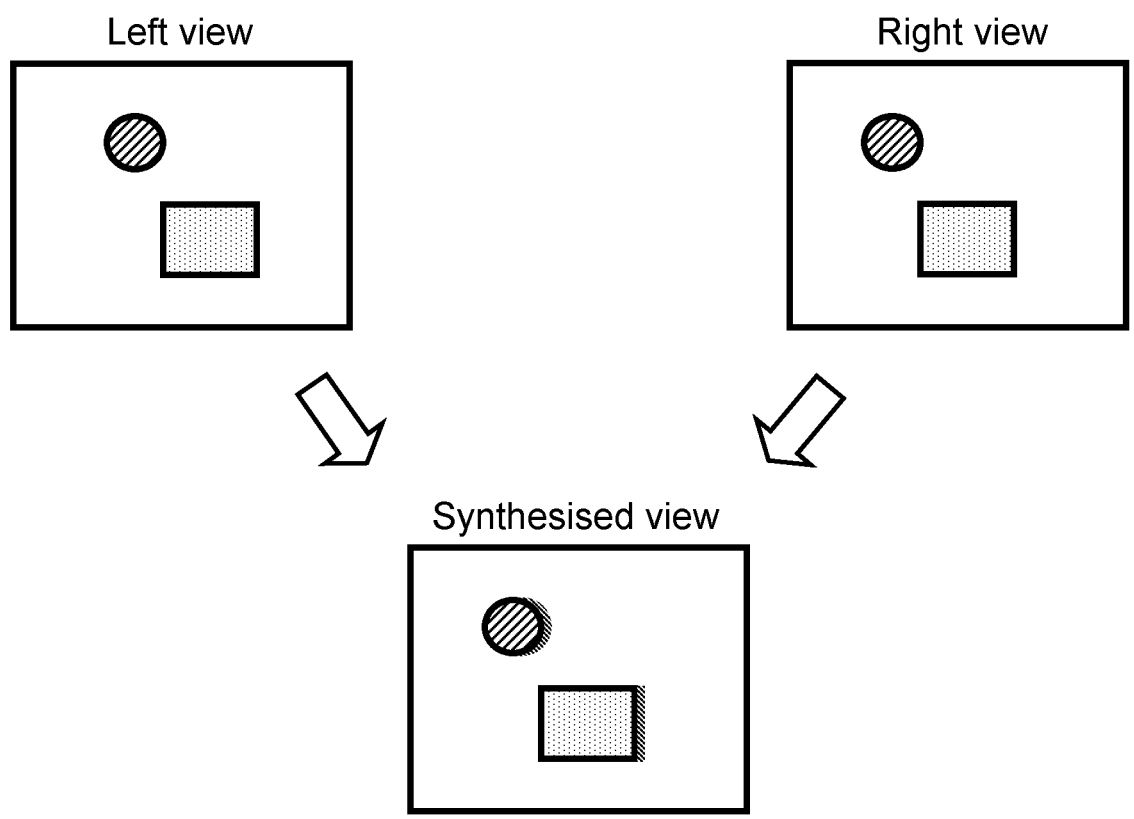
FIG. 1 illustrates a synthesis of the view from two other views, according to prior art. Areas dis-occluded in one view are marked grey in the synthesised view.
Figure 2:
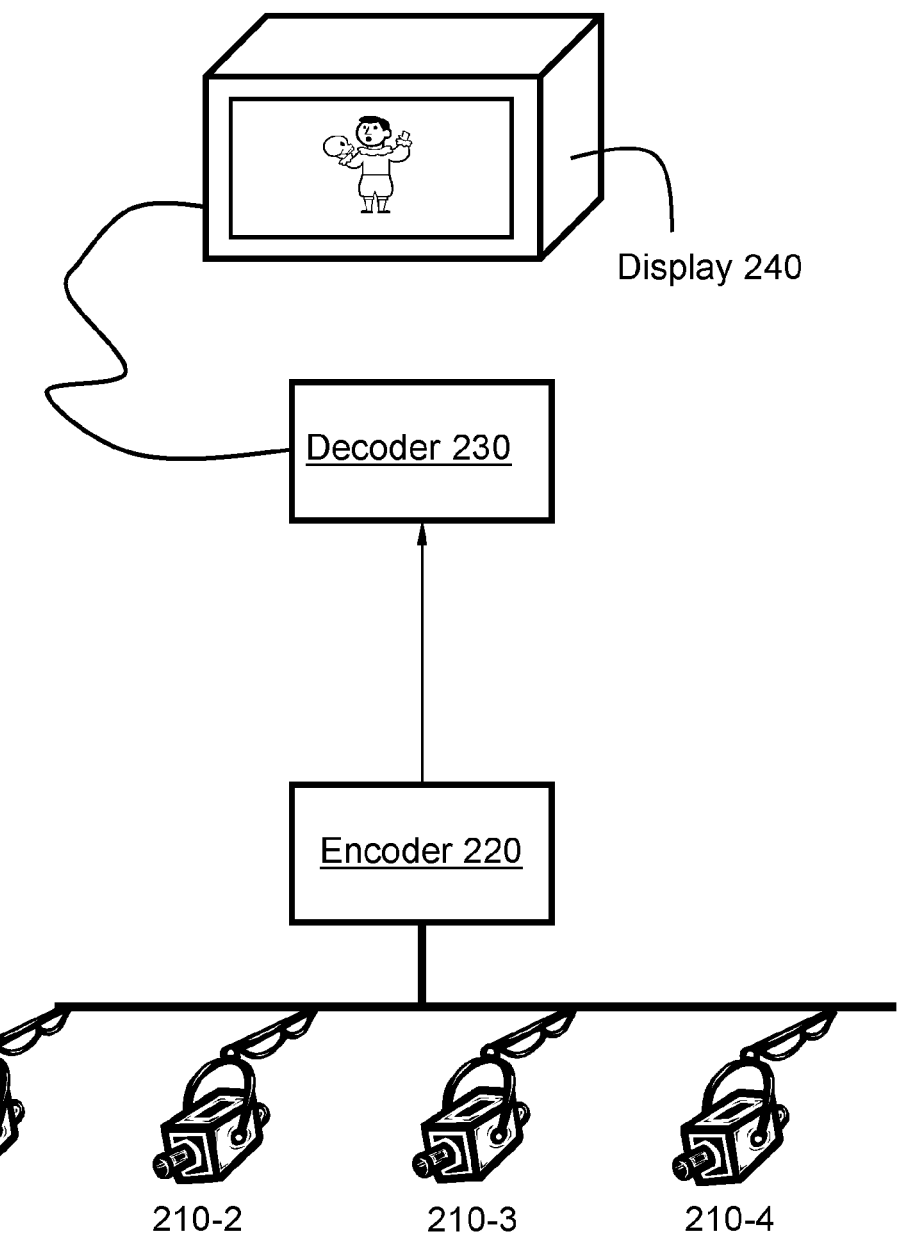
FIG. 2 is a block diagram illustrating embodiments of an encoder and a decoder.
Figure 2:
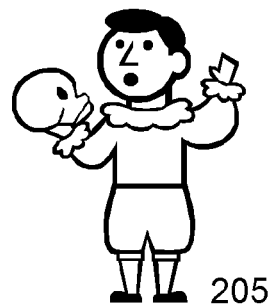

FIG. 2 is a schematic illustration over a system 200, for recording, encoding, transferring, decoding and rendering an image. The purpose of the illustration in FIG. 2 is to provide a simplified, general overview of the methods and entities herein described, and the functionalities involved. The system 200 may at least partly be based on technologies such as e.g. 3D video/TV, Multiview Video Coding (MVC), Multiview plus Depth (MVD), Layered Depth Video (LDV), Depth Image Based Rendering (DIBR), Advanced Video Coding (AVC) and/or Depth Enhanced Stereo (DES). The system 200 aims at enabling a view synthesiser/decoder 230 to determine the range of positions at which additional views may be synthesised.

An image e.g. of an actor 205 is recorded by at least one real camera 210-1 comprised in a set of real cameras 210-1, 210-2, 210-3, 210-4. The image is then encoded in an encoder 220 according to any appropriate encoding algorithm e.g. together with, or associated with a spatial validity range. Thus the image of the at least one real camera 210-1, or information recorded by the at least one real camera 210-1 such as a texture, a depth map, occlusion data or occlusion depth or a part of the occlusion data may be given a spatial range and possibly a camera direction, referred to as spatial validity range.

The spatial validity range thus comprises coordinates, or data enabling the decoder 230 to compute coordinates, that may be used for determining if a view, or parts of a view of the real camera 210-1 may be used for synthesising an image of a virtual camera position, i.e. a desired camera position that the decoder 230 desire to regenerate.

The encoder 220 may further transmit the image data/information to the decoder 230. The image data/information may be transmitted over a wired connection, or a wireless connection, which may be based on e.g. 3GPP LTE, LTE-Advanced, Evolved Universal Terrestrial Radio Access Network (E-UTRAN), UMTS, GSM/Enhanced Data rate for GSM Evolution (GSM/EDGE), Wideband Code Division Multiple Access (WCDMA), Worldwide Interoperability for Microwave Access (WiMax), or Ultra Mobile Broadband (UMB), High Speed Packet Access (HSPA) Evolved Universal Terrestrial Radio Access (E-UTRA), Universal Terrestrial Radio Access (UTRA), GSM EDGE Radio Access Network (GERAN), 3GPP2 CDMA technologies e.g. CDMA2000 1x RTT and High Rate Packet Data (HRPD), just to mention some few options.

The decoder 230 then may receive and decode the image data/information and determine the spatial validity range of the at least one real camera 210-1, which spatial validity range specifies for the decoder 230 what information/data to use for synthesising the image of a virtual camera position. When the virtual camera position is considered to be situated within the determined spatial validity range, a view synthesis may be performed, which may be rendered on a display 240.

According to some embodiments described herein, a higher quality view synthesis may be achieved by indicating to the decoder 230 what information, such as texture data, depth maps, occlusion texture and depth to use for view synthesis at a chosen camera position, i.e. a virtual camera position. According to some embodiments, every entity, or at least some of the entities, such as a texture, a depth map, occlusion data or occlusion depth or a part of the occlusion data are given a spatial range and possibly a camera direction, referred to as validity range, specifying that this information may be used for view synthesis at the particular camera positions within that range. This allows the decoder to choose which data from the available it may chose for the view synthesis at the chosen position i.e. the virtual camera position.

The encoder 220 may according to some embodiments be configured to signal a confidence index for the data at the particular camera positions. Then, the decoder 230 or view renderer/synthesiser may be configured to receive the confidence index and to choose for the view synthesis the data with the highest confidence indices. The signalling information for view synthesis may comprise a 1D index in case of 1D camera arrangement, or a range boundary. In case of more complex camera configurations, the index may comprise the camera parameters, 2D or 3D indices or ranges, according to different embodiments.

Accordingly, a method is provided in an encoder 220 for sending at least one validity range associated with an entity such as a texture, a depth map, occlusion data or occlusion depth or a part of the occlusion data to the decoder 230. Furthermore, a method in a decoder 230 is provided for receiving at least one validity range and to take that validity range into account when synthesising camera views.

The encoder 220 comprises an input section for receiving input from the camera 210-1, 210-2, 210-3, 210-4 and a processor for determining spatial validity ranges for different entities. The encoder 220 further comprises an output section for sending the determined spatial validity ranges and possibly also a memory for storing information.

The decoder 230 comprises an input section for receiving at least one spatial validity range from the encoder 220. The spatial validity range(s) is/are processed by a processor and used by a view synthesiser to synthesise views. The view synthesiser may be comprised within the decoder 230 according to some embodiments, or be a separate external unit connected to, or associated with the decoder 230. Further, the decoder 230 also may comprise a memory for storing related information, in some embodiments.

Thanks to embodiments herein, the decoder 230 is informed at which virtual camera positions it is feasible to perform view synthesis and which data are needed for such operation. Thus the decoder 230 is informed about which spatial validity range that is associated with image data of a certain camera 210-1, 210-2, 210-3, 210-4. Based on that information, the decoder 230 is enabled to decide which data segments it may download for a given view synthesis operation. Thereby is a reduced complexity in the decoder side, while achieving a better utilization of the transport stream.

Figure 3A:
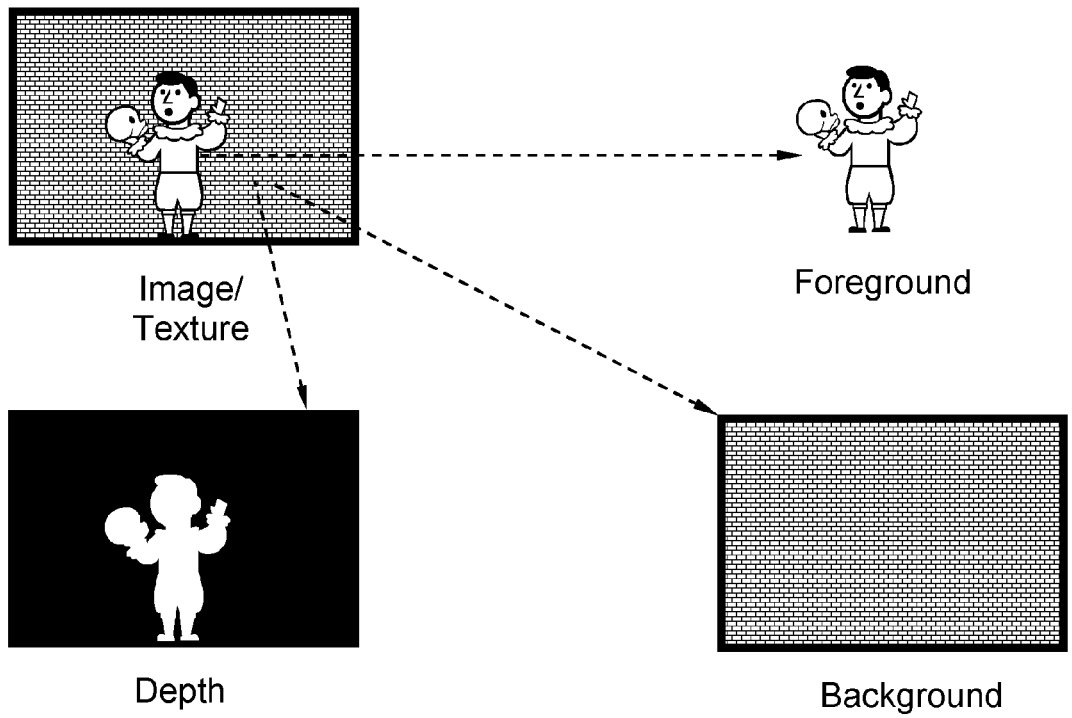
FIG. 3A is a block diagram illustrating an example of image data, according to some embodiments.

FIG. 3A illustrates an example of an image of a camera 210-1, which image may be divided into texture, or foreground of the image, and depth, or background of the image. The image of the camera 210-1 may also be referred to as a view of the camera 210-1. According to some embodiments, the image may be further divided into a plurality of depth layers.

When the image data is transmitted from the encoder 220 to the decoder 230, the different parts of image, such as the texture and the depth may have different spatial validity range according to some embodiments. However, in some circumstances, the texture and the depth of a view of the camera 210-1 may have the same spatial validity range.

Figure 3B:
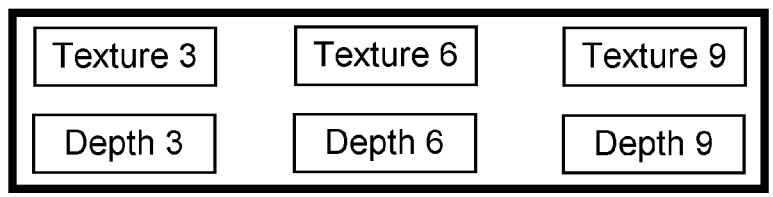
FIG. 3B is a block diagram illustrating an example of image data, according to some embodiments.

FIG. 3B illustrates an example of an image data provided from a set of cameras 210-1, 210-2, 210-3, 210-4 comprised in a camera rig. The image data may be divided into texture data and depth data, as discussed together with presenting FIG. 3A.

A 3DTV camera rig may comprise up to M cameras 210-1, 210-2, 210-3, 210-4, or M views, where M is an arbitrary integer. These are usually arranged in a 1D formation, mounted in parallel to each other on the same axis according to some embodiments. However, the cameras 210-1, 210-2, 210-3, 210-4 may be arranged in 2D formations, or other formations according to different embodiments. For identification reasons each camera 210-1, 210-2, 210-3, 210-4 may be denoted by an index number 1, 2, 3, etc. These cameras 210-1, 210-2, 210-3, 210-4 may physically be located somewhere in the 3D space and may be seen as sampling points. Due to bandwidth or storage constraints only a limited number of views may be encoded. Such case is illustrated in FIG. 3B.

It may be assumed that views 3, 6 and 9, denoted texture, along with their depth data, denoted depth, are part of the data stream. These ranges may be intentionally selected to be wide apart from each other so that N-view autostereoscopic screens, such as a 2-view autostereoscopic screen or 3-view autostereoscopic screen may provide a wide range of viewing angles. Further, it may be assumed that for better view synthesis results the data stream also may comprise some disocclusion data. This is illustrated in FIG. 3C.

Figure 3C:
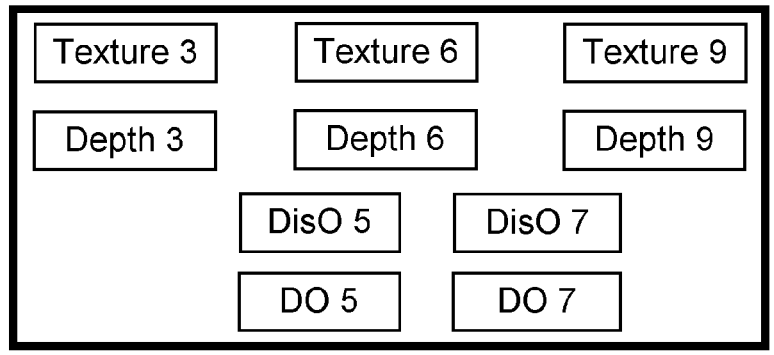
FIG. 3C is a block diagram illustrating an example of image data, according to some embodiments.

Usually the disocclusion data, denoted DisO in FIG. 3C, along with their corresponding depth, denoted DO in FIG. 3C, are between two particular viewing angles but this may be a bit more complex, as will be explained more in detail further down. In a non-limiting illustrating example, it may be assumed that the stream has disocclusion information at positions 5 and 7.

From the above configuration as illustrated in FIG. 3C, it is not clear where the decoder 230 may synthesise additional views. Is it ok to synthesise at positions 3.2, 3.5 or 4? Are the available data too far from these viewing angles to be reliable? A possible approach would be to let the decoder 230 synthesise and hope for an acceptable result. But since content based objective metrics are not mature yet, the decoder 230 cannot assess the quality of the generated view. For that reason it is imperative to signal to the decoder 230 the range on the 1D axis at which each data component is reliable, i.e. the spatial validity range.

Figure 3D:
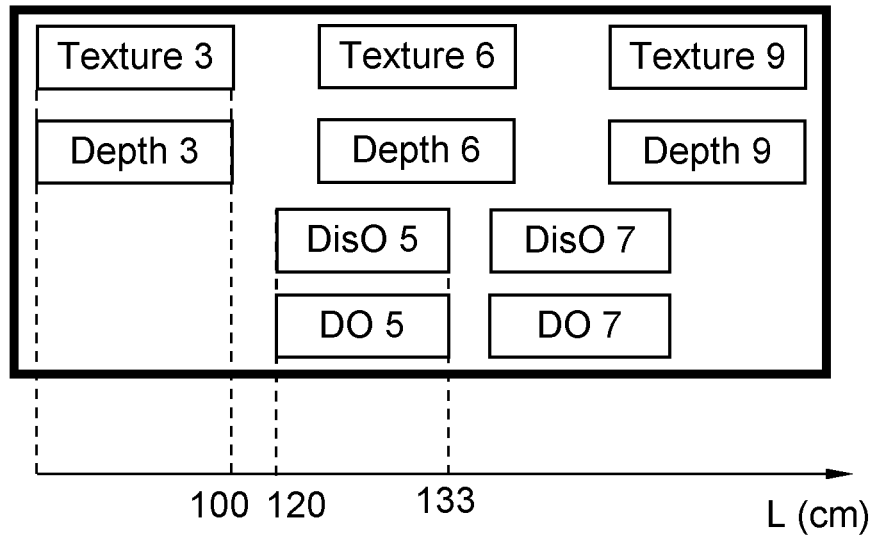
FIG. 3D is a block diagram illustrating an example of image data, according to some embodiments.

As illustrated in FIG. 3D, the spatial validity range for disocclusion map 5 may be in the form of coordinates in a coordinate system such as e.g. [120 cm, 133 cm], which means that the map is valid between 120 cm and 133 cm, counted from origin of a coordinate system. It is to be noted that these limit values are only examples of limit values according to some embodiments. Further, the limit values do not necessarily have to be determined in cm, but may be made in e.g. metres, inches, feet, yards, fathoms, rods or any other appropriate length measurement. In this case, the origin, or 0, may correspond to the beginning of the coordinate system, or the first camera 210-1 on the rig. Alternatively, another point may be chosen as the origin of 3D space. The validity range may also be in the form of <positions, range> which again for DisO5 is <126.5 cm, 6.5 cm>; this translates into the following: the map is centred on position 126.5 and ranges ±6.5 cm.

So, according to an illustrating example for the 1D case depicted in FIG. 3A-D, the decoder 230 and/or the view renderer/synthesiser, may receive the following validity range indices:

View 3: [70 cm, 90 cm]
DisO5: [120 cm, 133 cm]
View 6: [125 cm, 145 cm]
DisO7: [140 cm, 153 cm]
View 9: [200 cm, 210 cm]

When the decoder 230 is requested to synthesise at a spatial position 130 cm it may use View 6 and fill the resulted holes with DisO5. On the other hand at spatial position 115 cm it knows that only view 3 may be used and the holes may be filled with inpainting.

The validity range may either be 1D, 2D or even 3D, according to different embodiments. The 1D case was presented earlier; the 2D case may comprise the form <[X range], [Y range]> whereas the 3D case may comprise the form <[X range], [Y range], [Z range]>.

The validity range may be determined by using subjective or objective quality measures, in different embodiments. In the former case and due to subjective evaluation the encoder 220 may be instructed to confine the index to a given range. In the second case, an objective metric may be used to determine the validity index. For example, Peak Signal-to-Noise Ratio (PSNR) for the synthesised view shows significant degradation after a certain distance from the constituent views. "Significant degradation" may be defined e.g. by comparing the signal quality with a threshold limit, adjusting the validity range to comprise the positions for which the signal quality exceeds the threshold limit. In that case the validity index may be set accordingly, in some embodiments.

Figure 4A:
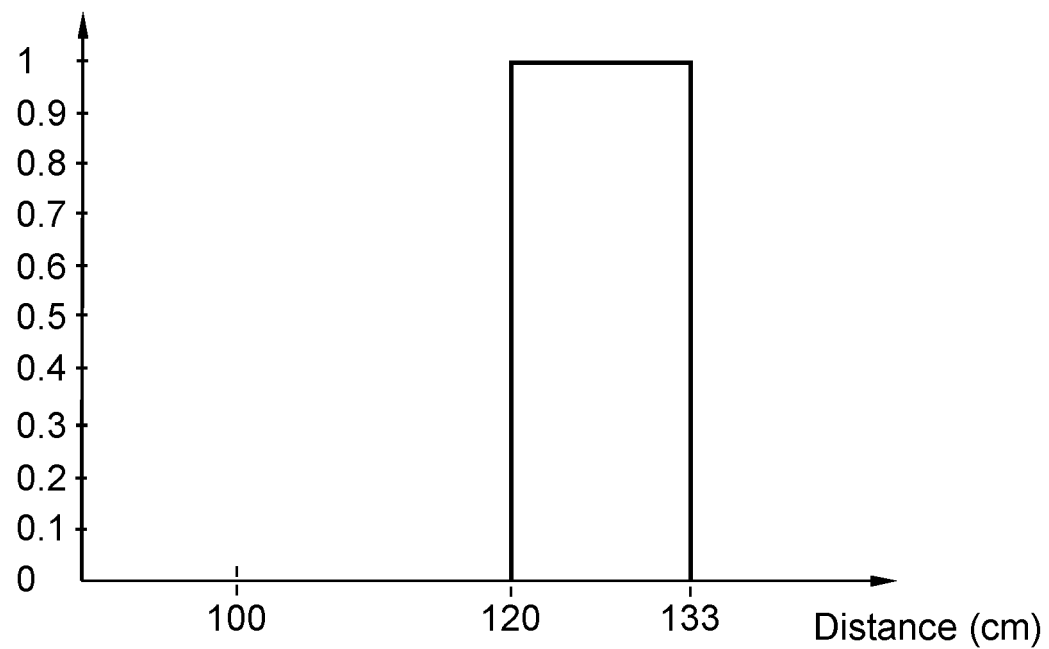
FIG. 4A is a diagram illustrating an example of a shape of a confidence index, according to some embodiments.

The value that the confidence index carries is another issue addressed according to some embodiments. In some embodiments, as presented above, the index may be constant over the entire spatial validity range. An example of such confidence index values is illustrated in the graph of FIG. 4A. The illustrated confidence index values thus comprises discrete values, being set to zero outside the spatial validity range and being set to one within the spatial validity range, in an embodiment.

However, other forms are of the confidence indices are possible. Examples of different shapes of confidence indices may be seen in FIG. 4B and FIG. 4C.

The values shown in the graphs may be seen as non-limiting examples indicating a recommended confidence for the decoder 230, or view renderer/synthesiser to use texture and/or depth information for a given camera view for the rendering. If the confidence index is high, the respective texture/depth information may be considered very reliable for rendering at the given synthesis position. At the opposite, if the confidence index is zero, it is recommended to not use the information, and intermediate values apply accordingly.

The reason to use different forms of the confidence index in some embodiments, instead of the step function relates to the view blending operation under consideration. That is, after warping one or multiple views to a given location, view blending may be performed. When blending the constituent views, they may have equal value or one/some of them may be more important. The validity index in such case may indicate how important a given view is. Values of less than one mean lower importance. But this may not be interpreted that the pixels/macroblocks/frame with importance less than one are ignored. However, the confidence index may indicate for the decoder 230 how much contribution from each view that is appropriate for synthesising a view of a virtual camera position.

Figure 4B:
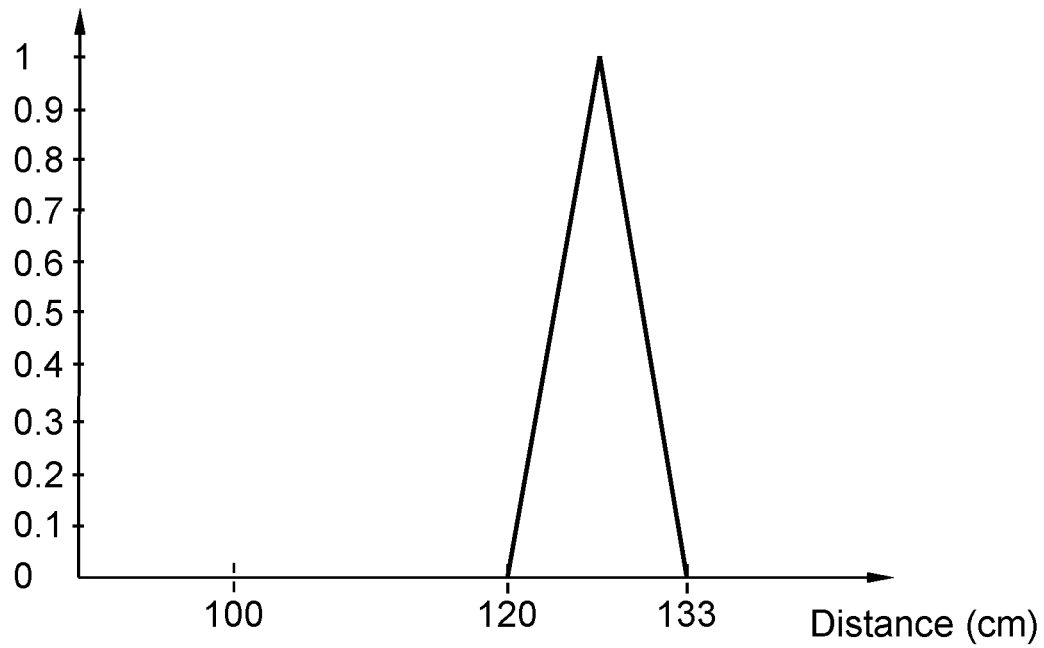
FIG. 4B is a diagram illustrating an example of a shape of a confidence index, according to some embodiments.
Figure 4C:
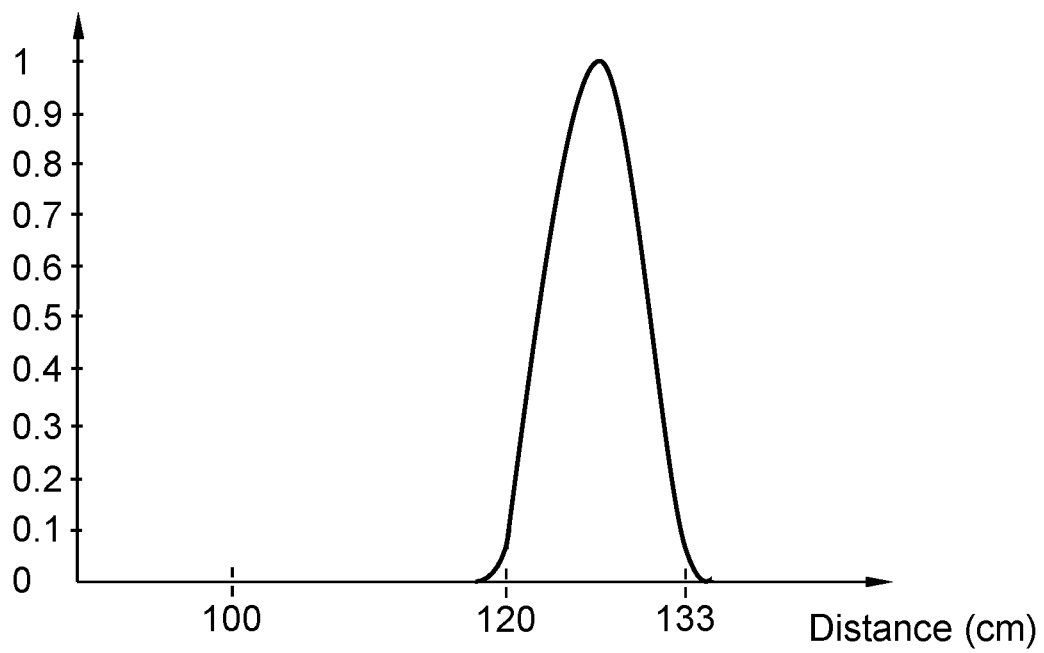
FIG. 4C is a diagram illustrating an example of a shape of a confidence index, according to some embodiments.

According to some embodiments, the confidence indices presented above and illustrated in FIGS. 4A-4C may be valid for the entire range. However, sometimes different parts of a frame may be valid for different ranges. In such case the frame segments may comprise macroblocks, arbitrarily shaped groups of pixels or even individual pixels in some embodiments. Information about the validity ranges may be transmitted explicitly or implicitly. In the latter case, the same algorithm may be run at the encoder or decoder in order to find the parts of the images that are valid. An example of such an algorithm may be an algorithm that finds disoccluded areas. In the case of segmenting the frame into different layers, such as depth layers, one may have different validity indices for these layers as well.

Another issue concerning hole filling may be how the decoder 230 deals with the holes resulted from the disocclusions. What inpainting method to use for specific case? For that a signalling mechanism may be suggested in which the encoder 220 instructs the decoder 230 which hole filling algorithm to use. This instruction may comprise e.g. an index number that corresponds to the hole filling methodology to use. Implicit signalling may be used from both encoder 220 and decoder 230 in some embodiments.

Subsequently, a non-limiting example of an embodiment will be described. In a first embodiment, the validity range may be signalled in a form of intervals. The SEI message syntax may be specified as suggested as in the Table 1 below, in some embodiments. In this embodiment, signalling of the spatial validity range may be done by indicating the borders of the validity range.

TABLE 1

| view_validity_range_info( payloadSize ) { | C | Descriptor |
|---|---|---|
| view_number (optional) | | ue(v) |
| prec_validity_range | 5 | ue(v) |
| sign_validity_interval_border 1 | 5 | u(1) |
| exponent_ validity_interval_border 1 | 5 | u(6) |
| mantissa_ validity_interval_border 1 | 5 | u(v) |
| sign_validity_interval_border 2 | 5 | u(1) |
| exponent_ validity_interval_border 2 | 5 | u(6) |
| mantissa_ validity_interval_border 2 | 5 | u(v) |
| } | | |

Another example of the proposed signalling may provide signalling of the disjoint intervals for camera validity range, as illustrated in the example in Table 2.

TABLE 2

| view_validity_range_info( payloadSize ) { | C | Descriptor |
|---|---|---|
| view_number (optional) | | ue(v) |
| prec_validity_range | 5 | ue(v) |
| num_of_validity_intervals | 5 | ue(v) |
| for( i = 0; i < num_of_validity_intervals; i++ ) { | | |
| sign_validity_interval_border 1 [ i ] | 5 | u(1) |
| exponent_ validity_interval_border 1 [ i ] | 5 | u(6) |
| mantissa_ validity_interval_border 1 [ i ] | 5 | u(v) |
| sign_validity_interval_border 2 [ i ] | 5 | u(1) |
| exponent_ validity_interval_border 2 [ i ] | 5 | u(6) |
| mantissa_ validity_interval_border 2 [ i ] | 5 | u(v) |
| } | | |

In case of non-1D (non-linear) camera arrangement, i.e. 2D and/or 3D camera arrangements, spatial validity ranges for all three coordinates may be signalled as in the following Table 3.

TABLE 3

| view_validity_range_info( payloadSize ) { | C | Descriptor |
|---|---|---|
| view_number (optional) | | ue(v) |
| prec_validity_range | 5 | ue(v) |
| num_of_validity_intervals | 5 | ue(v) |
| for( i = 0; i < num_of_validity_intervals; i++ ) { | | |
| sign_validity_interval_border_x 1 [ i ] | 5 | u(1) |
| exponent_ validity_interval_border_x 1 [ i ] | 5 | u(6) |
| mantissa_ validity_interval_border_x 1 [ i ] | 5 | u(v) |
| sign_validity_interval_border_x 2 [ i ] | 5 | u(1) |
| exponent_ validity_interval_border_x 2 [ i ] | 5 | u(6) |
| mantissa_ validity_interval_border_x 2 [ i ] | 5 | u(v) |
| sign_validity_interval_border_y 1 [ i ] | 5 | u(1) |
| exponent_ validity_interval_border_y 1 [ i ] | 5 | u(6) |
| mantissa_ validity_interval_border_y 1 [ i ] | 5 | u(v) |
| sign_validity_interval_border_y 2 [ i ] | 5 | u(1) |
| exponent_ validity_interval_border_y 2 [ i ] | 5 | u(6) |
| mantissa_ validity_interval_border_y 2 [ i ] | 5 | u(v) |
| sign_validity_interval_border_z 1 [ i ] | 5 | u(1) |
| exponent_ validity_interval_border_z 1 [ i ] | 5 | u(6) |
| mantissa_ validity_interval_border_z 1 [ i ] | 5 | u(v) |
| sign_validity_interval_border_z 2 [ i ] | 5 | u(1) |
| exponent_ validity_interval_border_z 2 [ i ] | 5 | u(6) |
| mantissa_ validity_interval_border_z 2 [ i ] | 5 | u(v) |
| } | | |

In addition to individual spatial validity ranges for each specific camera view, one common view synthesis range, i.e. spatial validity range may be sent for the whole set of multiple views according to some embodiments. In those embodiments, the common spatial validity range indicates the total view synthesis range for the whole multi-view representation. In those embodiments, the syntax below may be used.

Figure 5A:
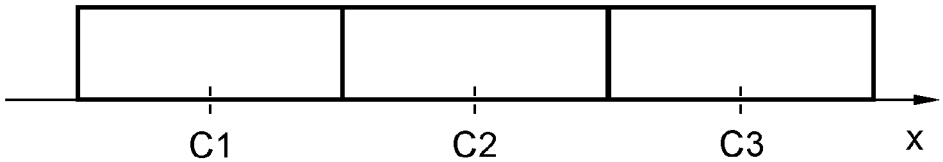
FIG. 5A is a block diagram illustrating an example of camera validity ranges, according to some embodiments.
Figure 5B:
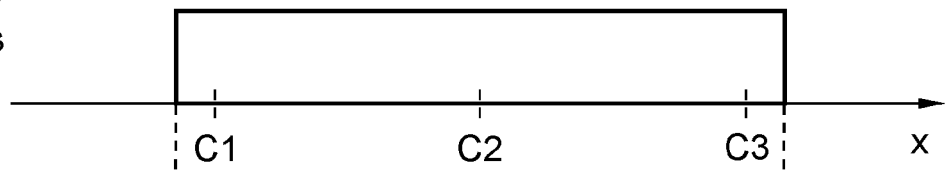
FIG. 5B is a block diagram illustrating an example of camera validity ranges, according to some embodiments.
Figure 5C:
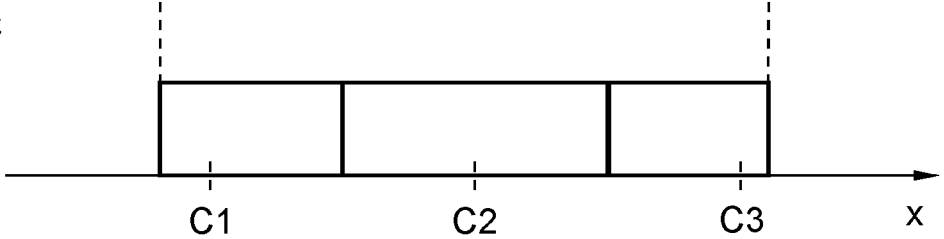
FIG. 5C is a block diagram illustrating an example of camera validity ranges, according to some embodiments.

In the syntax table, syntax element union_with_camera_ranges indicates whether the spatial validity range for cameras 220-1, 220-2, 220-3, 220-4 may be obtained as the union between the signalled range and the new ranges. If the value of the syntax value is TRUE, the spatial validity range for the whole set of representation may be determined as the union of the spatial validity ranges for the representation and the spatial validity ranges for every single camera 220-1, 220-2, 220-3, 220-4. Otherwise, if the value of the syntax element union_with_camera_ranges may be equal to FALSE, then the final spatial validity range for the multi-view representation is found as the intersection of signalled spatial validity range for the whole representation and the spatial validity range that is obtained as a union of the spatial validity ranges of the separate cameras 220-1, 220-2, 220-3, 220-4 as illustrated in FIGS. 5A-5C.

Another syntax element that may be used in the signalling of the spatial validity range for the final representation in some embodiments may comprise ignore_camera_ranges. In this case, the SEI message, or common view synthesis range, for the whole representation set may replace the spatial validity ranges set for the separate cameras 220-1, 220-2, 220-3, 220-4. Then, the spatial validity ranges for the separate cameras 220-1, 220-2, 220-3, 220-4 may not be considered when deciding whether a view at the particular camera position may be synthesised.

TABLE 4

| view_validity_total_range_info( payloadSize ) { | C | Descriptor |
|---|---|---|
| ingnore_camera_ranges | 5 | u(1) |
| union_with camera ranges | 5 | u(1) |
| prec_validity_range | 5 | ue(v) |
| signal_x_component | 5 | u(1) |
| signal_y_component | 5 | u(1) |
| signal_z_component | 5 | u(1) |
| num_of_validity_intervals | 5 | ue(v) |

TABLE 4-continued

| view_validity_total_range_info( payloadSize ) { | C | Descriptor |
|---|---|---|
| for( i = 0; i < num_of_validity_intervals; i++ ) { | | |
|   if (signal_x_component){ | | |
|     sign_validity_interval_border_x 1 [ i ] | 5 | u(1) |
|     exponent_ validity_interval_border_x 1 [ i ] | 5 | u(6) |
|     mantissa_ validity_interval_border_x 1 [ i ] | 5 | u(v) |
|     sign_validity_interval_border_x 2 [ i ] | 5 | u(1) |
|     exponent_ validity_interval_border_x 2 [ i ] | 5 | u(6) |
|     mantissa_ validity_interval_border_x 2 [ I ] | 5 | u(v) |
|   } | | |
|   if (signal_y_component){ | | |
|     sign_validity_interval_border_y 1 [ i ] | 5 | u(1) |
|     exponent_ validity_interval_border_y 1 [ i ] | 5 | u(6) |
|     mantissa_ validity_interval_border_y 1 [ i ] | 5 | u(v) |
|     sign_validity_interval_border_y 2 [ i ] | 5 | u(1) |
|     exponent_ validity_interval_border_y 2 [ i ] | 5 | u(6) |
|     mantissa_ validity_interval_border_y 2 [ i ] | 5 | u(v) |
|   } | | |
|   if (signal_z_component){ | | |
|     sign_validity_interval_border_z 1 [ i ] | 5 | u(1) |
|     exponent_ validity_interval_border_z 1 [ i ] | 5 | u(6) |
|     mantissa_ validity_interval_border_z 1 [ i ] | 5 | u(v) |
|     sign_validity_interval_border_z 2 [ i ] | 5 | u(1) |
|     exponent_ validity_interval_border_z 2 [ i ] | 5 | u(6) |
|     mantissa_ validity_interval_border_z 2 [ i ] | 5 | u(v) |
|   } | | |
| } | | |
| } | | |

According to some embodiments, the spatial validity range may be sent as an offset from the camera centre coordinates. Then, the validity range may be determined as an interval (camera_center_x−validity_range_max_offset, camera_center+validity_range_max_offset). Further, according to those embodiments, the sender, i.e. the encoder 220 may not need to send a sign of the camera_validity_range_max_offset, as it is always a positive number. The SEI message below in Table 5 may be used in case of the view synthesis ranges symmetrical over the camera position, as may be the case according to some embodiments.

TABLE 5

| view_symmetrical_validity_range _info( payloadSize ) { | C | Descriptor |
|---|---|---|
| view_number (optional) | | ue(v) |
| prec_validity_range_max_offset | 5 | ue(v) |
| exponent_ validity_range_ max_offset | 5 | u(6) |
| mantissa_ validity_range_ max_offset | 5 | u(v) |
| } | | |

In case the camera arrangement is different from 1D linear arrangement, such as a 2D or 3D arrangement, two variants of signalling the view synthesis range may be used. In the first case (see Table 6 below), the offset range for each coordinate (x, y, and z) may be sent. Otherwise, one value of the validity_range_max_offset may be sent. In this case, the spatial validity range for the view synthesis may be a sphere having its origin in the camera position.

TABLE 6

| view_symmetrical _validity_range_info( payloadSize ) { | C | Descriptor |
|---|---|---|
| view_number (optional) | | ue(v) |
| prec_validity_range | 5 | ue(v) |
| exponent_ validity_range_max_offset | 5 | u(6) |
| mantissa_ validity_range_max_offset | 5 | u(v) |
| } | | |

Otherwise, when the offsets for x, y and z coordinates are different from each other, different symmetrical offsets may be sent for different coordinates. The example of the spatial validity range SEI is given in Table 7 below.

TABLE 7

| view_symmetrical _validity_range_info( payloadSize ) { | C | Descriptor |
|---|---|---|
| view_number (optional) | | ue(v) |
| prec_validity_range | 5 | ue(v) |
| exponent_ validity_range_max_offset _x | 5 | u(6) |
| mantissa_ validity_range_max_offset _x | 5 | u(v) |
| exponent_ validity_range_max_offset _y | 5 | u(6) |
| mantissa_ validity_range_max_offset _y | 5 | u(v) |
| exponent_ validity_range_max_offset _z | 5 | u(6) |
| mantissa_ validity_range_max_offset _z | 5 | u(v) |
| } | | |

The spatial validity range for the whole representation may also be sent by using the SEI (or representation) view_validity_total_range_info( ) from the previously described embodiment.

If all the cameras 220-1, 220-2, 220-3, 220-4 in the representation, i.e. in the set of cameras 220-1, 220-2, 220-3, 220-4, have the same spatial validity range, this may be signalled by sending the spatial validity range that is valid for all the cameras 220-1, 220-2, 220-3, 220-4. For the example of this SEI message view_validity_range_all_cameras_info( ) in the Table 8 below. An advantage with this embodiment is that less data has to be transmitted between the encoder 220 and the decoder 230, which saves transmission energy of the encoder 220 and thereby also prologues the activity time of the battery of the encoder 220, and also leads to less overhead data, less interference and faster transmission of the data.

TABLE 8

| view_validity_range_all_views_info ( payloadSize ) { | C | Descriptor |
|---|---|---|
| prec_validity_range_max_offset | 5 | ue(v) |
| exponent_ validity_range_ max_offset | 5 | u(6) |
| mantissa_ validity_range_ max_offset | 5 | u(v) |
| } | | |

In order to specify the maximum deviation of the camera direction, the camera angle may be signalled in addition to the validity range. This would indicate that the direction of the virtual camera being synthesised may not differ with more than the specified angle from the camera direction in respect to the angles phi_z, phi_y and phi_z in degrees.

The value of angles may also be sent separately for each angle (phi_x, phi_y and phi_z). The example of the SEI message that includes sending the rotation angles is provided below (view_synthesis_range) in Table 9.

TABLE 9

| view_symmetrical _validity_range_info( payloadSize ) { | C | Descriptor |
|---|---|---|
| view_number (optional) | | ue(v) |
| prec_validity_range | 5 | ue(v) |
| exponent_ validity_range_max_offset _x | 5 | u(6) |
| mantissa_ validity_range_max_offset _x | 5 | u(v) |
| exponent_ validity_range_max_offset _y | 5 | u(6) |
| mantissa_ validity_range_max_offset _y | 5 | u(v) |
| exponent_ validity_range_max_offset _z | 5 | u(6) |
| mantissa_ validity_range_max_offset _z | 5 | u(v) |

TABLE 9-continued

| view_symmetrical_validity_range_info( payloadSize ) { | C | Descriptor |
|---|---|---|
|   same_angle | 5 | u(1) |
|   if(same_angle){ | | |
|     exponent_phi_max_offset | 5 | u(6) |
|     mantissa_phi_max_offset | 5 | u(v) |
|   else{ | | |
|     exponent_phi_x_max_offset | 5 | u(6) |
|     mantissa_phi_x_max_offset | 5 | u(v) |
|     exponent_phi_y_max_offset | 5 | u(6) |
|     mantissa_phi_y_max_offset | 5 | u(v) |
|     exponent_phi_z_max_offset | 5 | u(6) |
|     mantissa_phi_z_max_offset | 5 | u(v) |
|   } | | |
| } | | |

In a further embodiment, the receiver, i.e. the decoder 230 is provided with the confidence index for the view synthesis. The confidence index may be used in the receiver/decoder 230/view synthesiser in order to decide during the view synthesis, information from which camera 220-1, 220-2, 220-3, 220-4 may be preferred as a source for view synthesis depending in the chosen location of the "virtual camera", i.e. the camera position, at which the view synthesis is performed, or desired to be performed, as selected by the decoder 230/synthesiser/view renderer. This view synthesis range may be sent as, for example, a piece-wise linear function according to some embodiments.

An example of the SEI message syntax for the confidence index of the camera 220-1, 220-2, 220-3, 220-4 is provided in Table 10 below. The example covers the case of 1D (linear) camera arrangement. The confidence interval signalling may be done by sending the values for the x component with corresponding values for the confidence interval according to some embodiments. As the confidence interval values are always greater or equal zero, one does not need to send a sign value. As one may bound the values of confidence index between two values (e.g. zero and plus one (or close to plus one)), one may choose the precision for signalling the values and then send the value of the index by using a fixed number of bits, according to some embodiments.

TABLE 10

| view_confidence_index_info( payloadSize ) { | C | Descriptor |
|---|---|---|
|   view_number (optional) | | ue(v) |
|   prec_range_x_coordinate | 5 | ue(v) |
|   bits_confidence_index | 5 | ue(v) |
|   num_of_confidence_points | 5 | ue(v) |
|   for( i = 0; i < num_of_confidence_points; i++ ) { | | |
|     sign_confidence_point_coord_x [ i ] | 5 | u(1) |
|     exponent_confidence_point_coord_x [ i ] | 5 | u(6) |
|     mantissa_confidence_point_coord_x [ i ] | 5 | u(v) |
|     confidence_index_value [ i ] | 5 | u(v) |
|   } | | |
| } | | |

In order to provide a wider range of confidence index values, a floating point representation for confidence indexes may be used. The confidence index in this case may only take positive values or zero. An example of the syntax for such confidence index representation according to some embodiments is given in Table 11 below.

TABLE 11

| view_confidence_index_info( payloadSize ) { | C | Descriptor |
|---|---|---|
|   view_number (optional) | | ue(v) |
|   prec_confidence_point_coord_x | 5 | ue(v) |
|   prec_confidence_index | 5 | ue(v) |
|   num_of_confidence_points | 5 | ue(v) |
|   for( i = 0; i < num_of_confidence_points; i++ ) { | | |
|     sign_confidence_point_coord_x [ i ] | 5 | u(1) |
|     exponent_confidence_point_coord_x [ i ] | 5 | u(6) |
|     mantissa_confidence_point_coord_x [ i ] | 5 | u(v) |
|     exponent_confidence_index [ i ] | 5 | u(6) |
|     mantissa_confidence_index [ i ] | 5 | u(v) |
| } | | |

Figure 6:
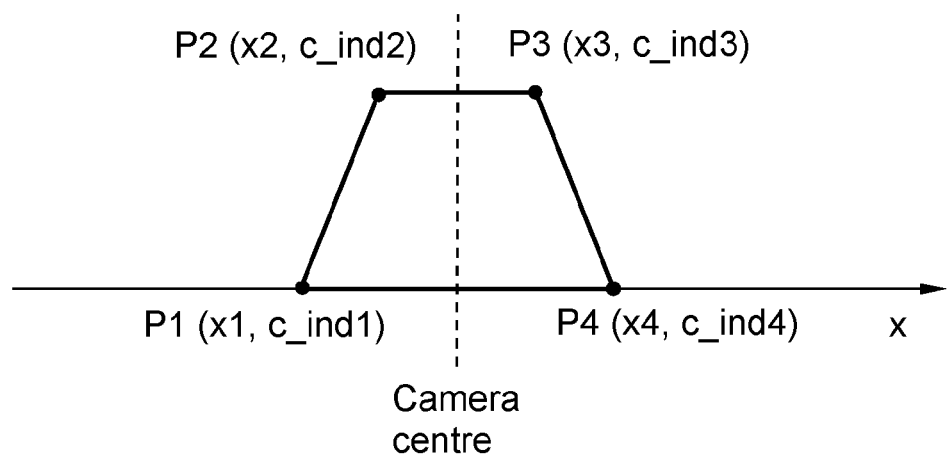
FIG. 6 is a block diagram illustrating signalling camera confidence index functions, according to some embodiments.

The requirement for the confidence_point_coord_x parameters in the signalling above may be non-decreasing in some embodiments. The confidence index function in this case may be obtained by connecting the points with the coordinates (confidence_point_coord_x, confidence_index) with straight lines. An example of such a function is shown in FIG. 6. Thereby, as illustrated, camera confidence index functions may be signalled to the receiver/decoder 230/view synthesiser as coordinates in a coordinate system, of points P1-P4.

Another example of sending the validity index may comprise sending the validity index in the coordinates relative to the camera centre of the corresponding camera 220-1, 220-2, 220-3, 220-4, as illustrated in Table 12. In this case, the confidence index may be bound to the changing camera coordinate if the coordinate of the camera centre is moving. It is possible to signal in the view_confidence_index_info SEI message whether one may use the original coordinate system or the coordinates relative to the centre of the camera 220-1, 220-2, 220-3, 220-4 to which the SEI belongs, in some embodiments.

TABLE 12

| view_confidence_index_info( payloadSize ) { | C | Descriptor |
|---|---|---|
|   view_number (optional) | | ue(v) |
|   prec_confidence_point_coord_x | 5 | ue(v) |
|   prec_confidence_index | 5 | ue(v) |
|   coord_relative_to_camera_center | 5 | u(1) |
|   num_of_confidence_points | 5 | ue(v) |
|   for( i = 0; i < num_of_confidence_points; i++ ) { | | |
|     sign_confidence_point_coord_x [ i ] | 5 | u(1) |
|     exponent_confidence_point_coord_x [ i ] | 5 | u(6) |
|     mantissa_confidence_point_coord_x [ i ] | 5 | u(v) |
|     exponent_confidence_index [ i ] | 5 | u(6) |
|     mantissa_confidence_index [ i ] | 5 | u(v) |
| } | | |

Moreover, the same camera validity range may be used for all the cameras 220-1, 220-2, 220-3, 220-4. The example is provided in Table 13 below.

TABLE 13

| view_confidence_index_all_views_info( payloadSize ) { | C | Descriptor |
|---|---|---|
|   prec_confidence_point_coord_x | 5 | ue(v) |
|   prec_confidence_index | 5 | ue(v) |
|   num_of_confidence_points | 5 | ue(v) |
|   for( i = 0; i < num_of_confidence_points; i++ ) { | | |
|     sign_confidence_point_coord_x [ i ] | 5 | u(1) |
|     exponent_confidence_point_coord_x [ i ] | 5 | u(6) |
|     mantissa_confidence_point_coord_x [ i ] | 5 | u(v) |
|     exponent_confidence_index [ i ] | 5 | u(6) |
|     mantissa_confidence_index [ i ] | 5 | u(v) |
| } | | |

Figure 7:
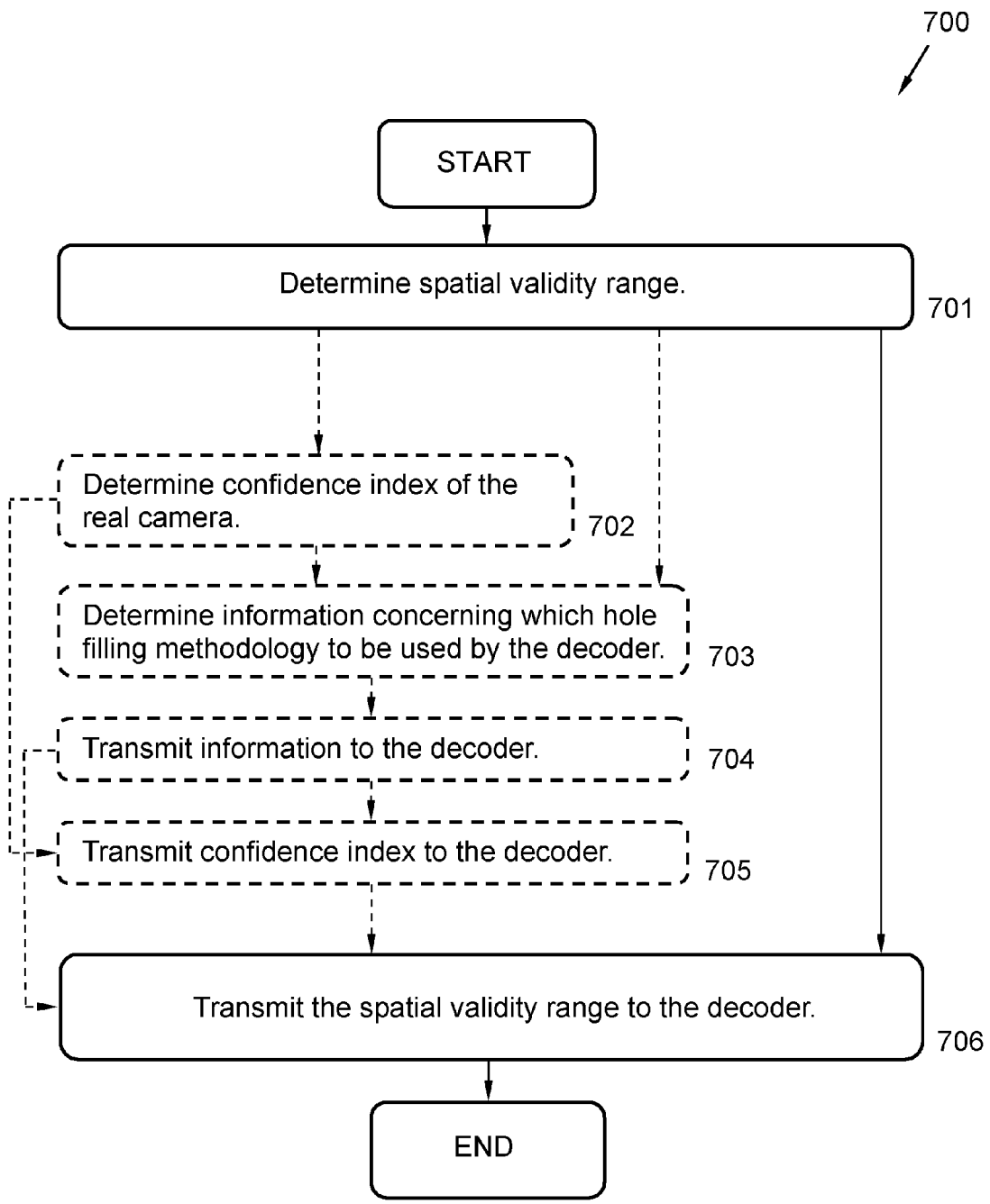
FIG. 7 is a block diagram illustrating embodiments of a method in an encoder.

FIG. 7 is a flow chart illustrating a method 700 in an encoder 220. The method 700 aims at providing information to a decoder 230 concerning a spatial validity range, at which view synthesis of an image at a virtual camera position is enabled, based on a view of at least one real camera 210-1, resulting in acceptable image quality i.e. a quality measurement exceeding a quality measurement threshold level. Thereby, the decoder 230 may be enabled to perform view synthesis of the image at the virtual camera position. The image to be synthesised at the virtual camera position may be a three dimensional auto stereoscopic image, or may comprise multiple images corresponding to different camera positions, according to some embodiments. The at least one real camera 210-1 is comprised in a set of real cameras 210-1, 210-2, 210-3, 210-4, e.g. comprised in a rig. The set of real cameras 210-1, 210-2, 210-3, 210-4 may comprise any number of cameras 210-1, 210-2, 210-3, 210-4, also comprising just one camera 210-1 in some embodiments. The method may be suitable for advising the decoder 230 about the range, i.e. spatial validity range of the virtual camera positions at which view synthesis may be performed with appropriate/acceptable image quality, i.e. a quality measurement exceeding a quality measurement threshold level.

The view of the real camera 210-1 may comprise a frame. Different parts of the frame may have different spatial validity ranges according to some embodiments.

The encoder 220 is configured for transmitting data associated with the at least one real camera 210-1 to the decoder 230 over a wired or wireless connection based on any appropriate radio access technology.

To provide information to a decoder 230 concerning a spatial validity range, at which view synthesis of an image at a virtual camera position is enabled, based on a view synthesis of an image at a virtual camera position, i.e. at any position desired by the decoder 230, the method 700 may comprise a number of actions 701-706. It is however to be noted that at least some of the actions 701-706 may be performed in another chronological order than the enumeration indicates and that any, some or all of them, i.e. actions 702 and 703 may be performed simultaneously or in a reversed chronological order. Further, it is to be noted that some embodiment does not comprise all of the described actions. For example, actions 702, 703, 704 and 705 may be comprised within some embodiments, but not necessarily all embodiments. The method 700 may comprise the following actions:

Action 701

The spatial validity range of the at least one real camera 210-1 is determined. The spatial validity range specifies for the decoder 230 what information to use for synthesising the image of the virtual camera position.

The spatial validity range may according to some embodiments comprise determining a common view synthesis range for a set of multiple views of the set of real cameras 210-1, 210-2, 210-3, 210-4. However, according to some embodiments, the spatial validity range of only one single real camera 210-1 may be transmitted.

Thereby is a spatial validity range, which may be associated with the view of the at least one real camera 210-1, i.e. the image of the at least one real camera 210-1, or a part of the image of the at least one real camera 210-1. Thus, in some embodiments, the information that is associated with the spatial validity range may comprise part of the view such as e.g. textures, depth maps, occlusion maps and/or occlusion depth.

The spatial validity range of the real camera 210-1 may be determined as a maximum coordinate and a minimum coordinate in a coordinate system in some embodiments.

However, according to some embodiments, the coordinates determining, i.e. defining, the spatial validity range of the at least one real camera 210-1, may comprise an offset from centre coordinates of the at least one real camera 210-1. Further, the spatial validity range may be determined by using an offset from any other spatial point as origin, in some embodiments.

According to some embodiments, the validity range may comprise a union between the common view synthesis range for the set of multiple views of the set of real cameras 210-1, 210-2, 210-3, 210-4, and the spatial validity range of the at least one real camera 210-1. Thus information indicating for the decoder 230 that the validity range comprises a union between the common view synthesis range and the spatial validity range of the at least one real camera 210-1 according to some embodiments.

However, according to some embodiments, the encoder 220 may transmit information to the decoder 230, indicating for the decoder 230 that the spatial validity range of the at least one real camera 210-1 may be replaced by the common view synthesis range for a set of multiple views of the set of real cameras 210-1, 210-2, 210-3, 210-4.

A possible advantage rendered by determining the spatial validity range of the at least one real camera 210-1, and letting them specify for the decoder 230 what information to use for synthesising the image of the virtual camera position is that the decoder 230 thereby is informed when the view of the real camera 210-1 may be used for synthesising the image of the virtual camera position, depending on whether the virtual camera position is situated within the spatial validity range of the at least one real camera 210-1, or not. Thereby, an improved quality of synthesised images of the decoder 230 is achieved. Another possible advantage is to avoid view synthesis at the virtual camera positions where the accessible information is not enough to render the synthesised view of acceptable quality.

Action 702

This action may be performed within some embodiments, but not necessarily all embodiments.

A confidence index of the at least one real camera 210-1 may be determined. The confidence index may comprise a number between zero and one according to some embodiments, wherein a high confidence index, i.e. close to one, indicates that the at least one real camera 210-1, or view of that at least one real camera 210-1, or part of a view of the at least one real camera 210-1 such as the texture may be considered more important when synthesising the view. Thus also, a low confidence index, i.e. close to zero, indicates that the at least one real camera 210-1 may be considered less important when synthesising the view.

A possible advantage of the confidence index, and by providing it to the decoder 230, the decoder 230 becomes aware of, and may estimate not only when a frame of a certain real camera 210-1 may be used when synthesising the image at the virtual camera position, but also to what extent it may be used for synthesising the view. Thus the decoder 230 may receive confidence indices for a plurality of images of a plurality of real cameras 210-1, 210-2, 210-3, 210-4, and use that information for determining a weighting factor for each of the images of the plurality of real cameras 210-1, 210-2, 210-3, 210-4 that may be used for synthesising the image at the virtual camera position from several images. Thereby, an improved view synthesising may be made by the decoder 230/view rendered/synthesiser.

Action 703

This action may be performed within some embodiments, but not necessarily all embodiments.

Information concerning which hole filling methodology to be used by the decoder 230 may be determined.

Such methods for hole filling may comprise e.g. depth-based in-painting, depth-based hole filling, morphological reconstruction and/or image warping, just to mention some few possible examples.

A possible advantage of selecting and providing information concerning which hole filling methodology to be used by the decoder 230 is that the encoder 220, which may base the decision on the kind of image the real camera 210-1, 210-2, 210-3, 210-4 is depicting. Thereby, the likelihood of synthesising an improved image of the virtual camera position at the decoder 230/view renderer/synthesiser may be increased.

Action 704

This action may be performed within some embodiments where the action 703 has been performed, but not necessarily all embodiments.

The determined 703 information concerning which hole filling methodology to be used by the decoder 230 may be transmitted to the decoder 230.

The hole filling methodology to be used by the decoder 230 may be the same for all views synthesised by the decoder 230 according to some embodiments. However, there may also be cases in some embodiments where different views, or different parts of one or more views may be associated with different hole filling methodologies, according to some embodiments.

Action 705

This action may be performed within some embodiments where the action 702 has been performed, but not necessarily all embodiments.

The determined 702 confidence index may be transmitted to be received by the decoder 230.

Action 706

The determined 701 spatial validity range is transmitted to the decoder 230.

According to some embodiments, the spatial validity range may comprise a common view synthesis range for a set of multiple views of the set of real cameras 210-1, 210-2, 210-3, 210-4. According to some such embodiments, the spatial validity range may comprise the determined common view synthesis range, which is transmitted to the decoder 230.

Further, in some embodiments, data representing the view of the at least one real camera 210-1 may be transmitted to the decoder 230, e.g. together with the determined 701 spatial validity range.

The spatial validity range of the real camera 210-1, may be transmitted as a maximum coordinate and a minimum coordinate in a coordinate system according to some embodiments.

The spatial validity range may be comprised in a Supplementary Enhancement Information (SEI) message, according to some embodiments.

Figure 8:
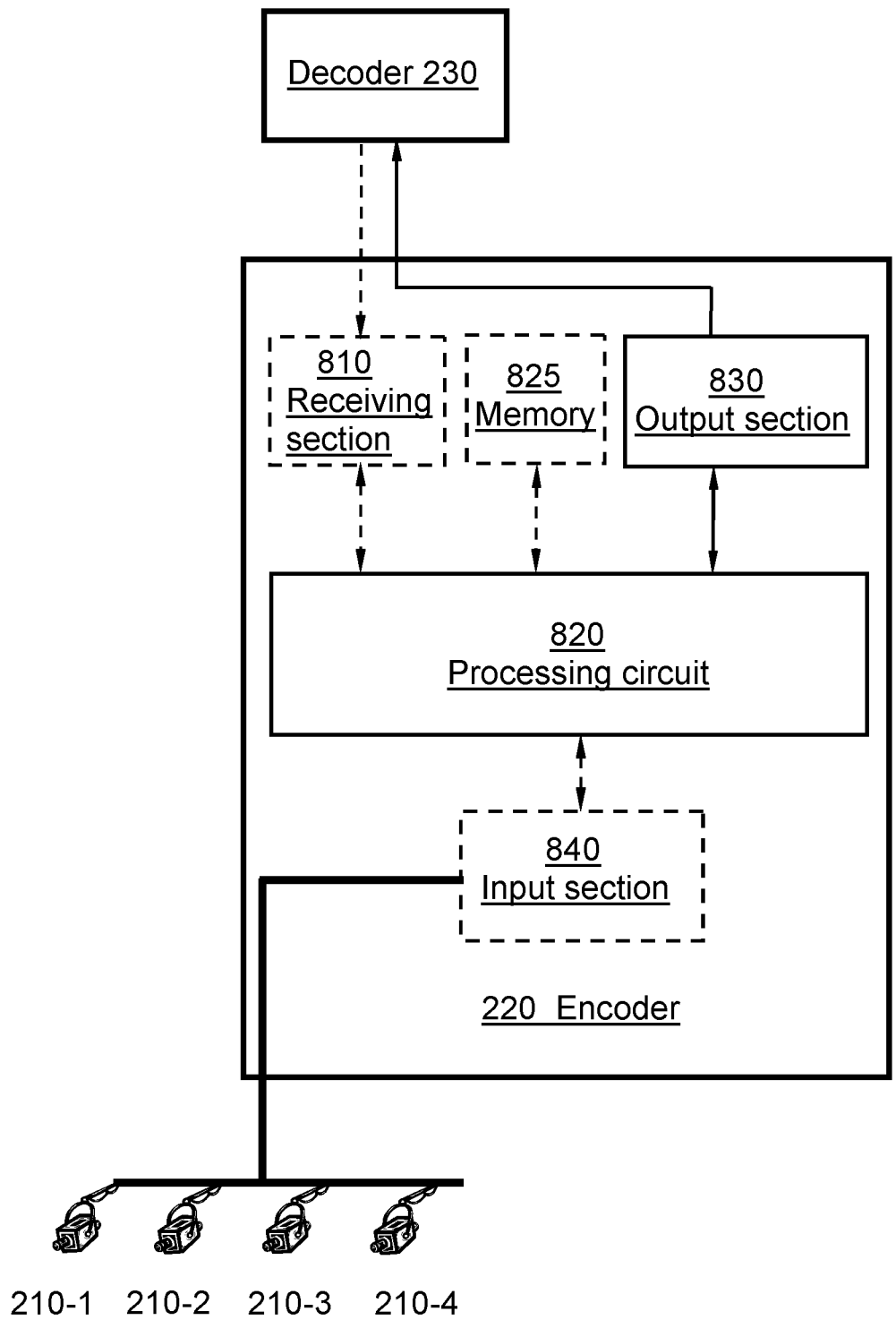
FIG. 8 is a block diagram illustrating an embodiment of an encoder.

FIG. 8 schematically depicts an embodiment of an encoder 220 configured to perform the above described actions 701-706. The encoder 220 aims at providing information to a decoder 230 concerning a spatial validity range, at which view synthesis of an image at a virtual camera position is enabled, based on a view of at least one real camera 210-1. The image to be synthesised at the virtual camera position may be a three dimensional auto stereoscopic image, or may comprise multiple images corresponding to different camera position, according to some embodiments. The at least one real camera 210-1 is comprised in a set of real cameras 210-1, 210-2, 210-3, 210-4, e.g. comprised in a rig. The set of real cameras 210-1, 210-2, 210-3, 210-4 may comprise any number of cameras 210-1, 210-2, 210-3, 210-4, also comprising just one camera 210-1. Thereby, the decoder 230 is enabled to perform the view synthesis of the image at the virtual camera position. Thus the encoder 220 may be suitable for advising the decoder 230 about the range, i.e. spatial validity range of the virtual camera positions at which view synthesis may be performed with appropriate/acceptable image quality, i.e. a quality measurement exceeding a quality measurement threshold level.

The view of the real camera 210-1 may comprise a frame. Different parts of the frame may have different spatial validity ranges according to some embodiments.

The encoder 220 is configured for transmitting data associated with the at least one real camera 210-1 to the decoder 230 over a wired or wireless connection based on any appropriate radio access technology.

To enable the decoder 230 to perform the view synthesis of the image at the virtual camera position, i.e. at any position desired by the decoder 230, by performing the actions 701-706 correctly the encoder 220 comprises a processing circuit 820, configured for determining a spatial validity range of the at least one real camera 210-1, whose spatial validity range specifies for the decoder 230 what information to use for synthesising the image of the virtual camera position.

For the sake of clarity, any internal electronics or other components of the encoder 220, not completely indispensable for understanding the implementation of the above described actions 701-706 comprised in the method 700 has been omitted from FIG. 8.

The spatial validity range may be comprised in a Supplementary Enhancement Information, SEI, message according to some embodiments.

The processing circuit 820 may comprise e.g. one or more instances of a Central Processing Unit (CPU), a processing unit, a processor, a microprocessor, means for processing data, or other processing logic that may interpret and execute instructions. The processing circuit 820 may further perform data processing functions for inputting, outputting, and processing of data comprising data buffering and device control functions, such as call processing control, user interface control, or the like.

Further, the encoder 220 also comprises an output section 830, configured for transmitting the determined spatial validity range to the decoder 230.

Furthermore, the processing circuit 820 may be further configured, according to some embodiments, for determining a common view synthesis range for a set of multiple views of the set of real cameras 210-1, 210-2, 210-3, 210-4.

The output section 830 may in some embodiments be further configured for transmitting the determined common view synthesis range to the decoder 230. Also, in some embodiments, the output section 830 may be further configured for transmitting information indicating for the decoder 230 that the validity range comprises a union between the common view synthesis range and the spatial validity range of the at least one real camera 210-1.

Also, in addition, the output section 830 may be further configured for transmitting information indicating for the decoder 230 that the spatial validity range of the at least one real camera 210-1 may be replaced by the common view synthesis range for a set of multiple views of the set of real cameras 210-1, 210-2, 210-3, 210-4, in some embodiments.

The processing circuit 820 may further be configured for transmitting data representing the view of the at least one real camera 210-1 together with the determined spatial validity range, to the decoder 230, according to some embodiments.

The processing circuit 820 may further be configured for determining a confidence index of the at least one real camera 210-1, and the output section 830 may further be configured for transmitting the determined confidence index to be received by the decoder 230.

In further addition, according to some embodiments, the output section 830 may be further configured for transmitting the spatial validity range of the real camera 210-1 as a maximum coordinate and a minimum coordinate in a coordinate system.

However, in some embodiments, the coordinates determining the spatial validity range of the at least one real camera 210-1, may comprise an offset from centre coordinates of the at least one real camera 210-1, according to some embodiments.

According to some embodiments, the processing circuit 820 may be further configured for determining which hole filling methodology to be used by the decoder 230. Furthermore, the output section 830 may in further addition also be configured for transmitting information concerning which hole filling methodology to be used, to the decoder 230.

According to some embodiments, the encoder 220 may comprise an input section 840. The input section 840 is configured for receiving data from the set of real cameras 210-1, 210-2, 210-3, 210-4.

Furthermore, some embodiments comprise a receiving section 810, configured for receiving signals from the decoder 230. Thereby, the encoder 220 may receive wired or wireless signals from the encoder 220 via the receiving section 810 according to some embodiments.

In further addition, the encoder 220 also in addition may comprise at least one memory 825. The memory 825 may comprise a physical device utilized to store data or programs i.e. sequences of instructions, on a temporary or permanent basis. According to some embodiments, the memory 825 may comprise integrated circuits comprising silicon-based transistors. Further, the memory 825 may be volatile, non-volatile or comprise some units which are volatile and some units which are non-volatile, according to different embodiments.

Further, it is to be noted that some of the described units 810-840 comprised within the encoder 220 in at least some embodiments, are to be regarded as separate logical entities but not with necessity separate physical entities. To mention just one example, the receiving section 810 and the output section 830 may be comprised or co-arranged within the same physical unit, a transceiver, which may comprise a transmitter circuit and a receiver circuit, which transmits outgoing radio frequency signals and receives incoming radio frequency signals, respectively, via an antenna in embodiments based on wireless transmissions. However, in some embodiments, the receiving section 810 and the output section 830 may be configured for communication over a wired interface. Further, embodiments herein may comprise communication via a versatile media, such as a DVD or Blu-ray disc. According to some such embodiments, the encoder 220 may comprise, or be connectable to, a media player such as e.g. a DVD/Blu-ray player.

The actions 701-706 to be performed in the encoder 220 may be implemented through one or more processing circuits 820 in the encoder 220, together with computer program code for performing the functions of the described actions 701-706, and/or implemented in hardware such as e.g. as an integrated circuit. Thus a computer program product, comprising instructions for performing the actions 701-706 in the encoder 220 may provide information to the decoder 230 concerning the spatial validity range, at which view synthesis of the image at the virtual camera position is enabled, based on a view of at least one real camera 210-1 comprised in a set of real cameras 210-1, 210-2, 210-3, 210-4, when being loaded into the one or more processing circuits 820.

The computer program product mentioned above may be provided for instance in the form of a data carrier carrying computer program code for performing at least some of the actions 701-706 according to some embodiments when being loaded into the processing circuit 820. The data carrier may be e.g. a hard disk, a CD ROM disc, a memory stick, an optical storage device, a magnetic storage device or any other appropriate medium such as a disk or tape that may hold machine readable data in a non-transitory manner. The computer program product may furthermore be provided as computer program code on a server and downloaded to the encoder 220 remotely, e.g. over an Internet or an intranet connection.

Figure 9:
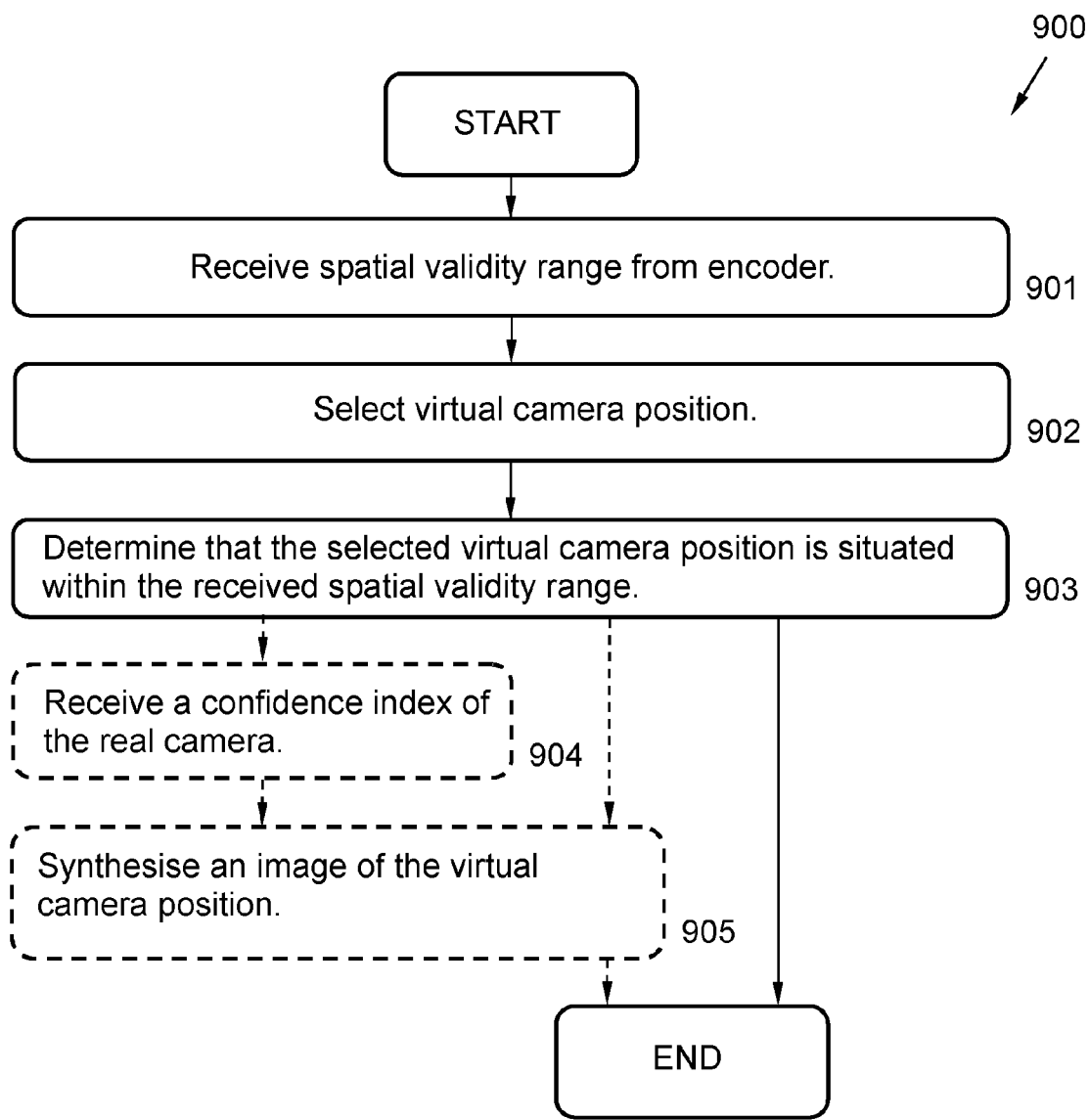
FIG. 9 is a block diagram illustrating embodiments of a method in a decoder.

FIG. 9 is a flow chart illustrating a method 900 in a decoder 230. The method 900 aims at receiving information from an encoder 220 concerning a spatial validity range, at which view synthesis of an image at a virtual camera position is enabled, based on a view of at least one real camera 210-1 comprised in a set of real cameras 210-1, 210-2, 210-3, 210-4, e.g. comprised in a rig. The image to be synthesised at the virtual camera position may be a three dimensional auto stereoscopic image, or may comprise multiple images corresponding to different camera positions, according to some embodiments. The set of real cameras 210-1, 210-2, 210-3, 210-4 may comprise any number of cameras 210-1, 210-2, 210-3, 210-4, also comprising just one camera 210-1. Thereby, the view synthesis of the image at the virtual camera position is enabled. Thus the method 900 may be suitable for receiving a piece of advice from the encoder 220 about the range, i.e. spatial validity range of the virtual camera positions at which view synthesis may be performed with appropriate/acceptable image quality, i.e. a quality measurement exceeding a quality measurement threshold level.

The view of the real camera 210-1 may comprise a frame. Different parts of the frame may have different spatial validity ranges according to some embodiments.

The decoder 230 is configured for receiving data associated with the at least one real camera 210-1 from the encoder 220 over a wired or wireless connection based on any appropriate radio access technology.

The decoder 230 may comprise, or be associated with, a view synthesiser according to some embodiments. The image of the virtual camera position may be synthesised in that view synthesiser, which also may be referred to as a renderer.

To enable the decoder 230 to receive information from the encoder 220 concerning a spatial validity range, in order to perform the view synthesis of the image at the virtual camera position, i.e. at any position desired by the decoder 230, the method 900 may comprise a number of actions 901-905. It is however to be noted that at least some of the actions 901-905 may be performed in another chronological order than the enumeration indicates and that any, some or all of them, i.e. actions 901 and 902 may be performed simultaneously or in a reversed chronological order. Further, it is to be noted that some embodiments do not comprise all of the described actions. For example, actions 904, and/or 905 may be comprised within some embodiments, but not necessarily all embodiments. The method 900 may comprise the following actions:

Action 901

A spatial validity range of the at least one real camera 210-1 is received from the encoder 220. The spatial validity range specifies for the decoder 230 what information to use for synthesising the image of the virtual camera position.

According to some embodiments, the spatial validity range may comprise a common view synthesis range for a set of multiple views of the set of real cameras 210-1, 210-2, 210-3, 210-4. However, according to some embodiments, the spatial validity range of only one single real camera 210-1 may be received from the encoder 220.

Thereby is a spatial validity range, which may be associated with the view of the at least one real camera 210-1, i.e. the image of the at least one real camera 210-1, or a part of the image of the at least one real camera 210-1 received. Thus, in some embodiments, the information that is associated with the spatial validity range may comprise part of the view such as e.g. textures, depth maps, occlusion maps and/or occlusion depth.

The spatial validity range of the real camera 210-1 may be received as a maximum coordinate and a minimum coordinate in a coordinate system in some embodiments.

However, according to some embodiments, the spatial validity range may comprise an offset from centre coordinates of the at least one real camera 210-1. Further, the spatial validity range may be determined by using an offset from any other spatial point as origin, in some embodiments.

According to some embodiments, the validity range may comprise a union between the common view synthesis range for the set of multiple views of the set of real cameras 210-1, 210-2, 210-3, 210-4, and the spatial validity range of the at least one real camera 210-1. Thus information indicating that the validity range comprises a union between the common view synthesis range and the spatial validity range of the at least one real camera 210-1 may be received according to some embodiments.

However, according to some embodiments, the decoder 230 may receive, from the encoder 220, information indicating that the spatial validity range of the at least one real camera 210-1 may be replaced by the common view synthesis range for a set of multiple views of the set of real cameras 210-1, 210-2, 210-3, 210-4.

Additionally, the decoder 230 may receive data representing the view of the at least one real camera 210-1 together with the received spatial validity range, according to some embodiments.

Furthermore, according to some embodiments, information indicating which hole filling methodology to be used may be received from the encoder 220.

Such methods for hole filling may comprise e.g. depth-based in-painting, depth-based hole filling, morphological reconstruction and/or image warping, just to mention some few possible examples.

A possible advantage of selecting and providing information concerning which hole filling methodology to be used by the decoder 230 is that the encoder 220, which may base the decision on the kind of image the real camera 210-1, 210-2, 210-3, 210-4 is depicting. Thereby, the likelihood of synthesising an improved image of the virtual camera position at the decoder 230/view rendered/synthesiser may be improved.

The spatial validity range may be comprised in a Supplementary Enhancement Information (SEI) message according to some embodiments.

Action 902

The virtual camera position, i.e. the spatial position for which the image is desired to be synthesised is selected.

That selection of virtual camera position may be made by the decoder 230, based on a desire concerning which view to synthesise, on the display setup (like the display width and the viewing distance) or the number of views (span of views) of the multi-view display.

Action 903

It is determined that the selected 902 virtual camera position is situated within the received 901 spatial validity range.

According to some embodiments, it may be determined that the selected 902 virtual camera position is situated within the received 901 common view synthesis range, in embodiments wherein such common view synthesis range has been received 901.

Action 904

This action may be performed within some, but not necessarily all embodiments.

A confidence index of the at least one real camera 210-1 may be received from the encoder 220.

The confidence index may comprise a number between zero and one according to some embodiments, wherein a high confidence index, i.e. close to one, indicates that the at least one real camera 210-1, or view of that at least one real camera 210-1, or part of a view of the at least one real camera 210-1 such as the texture may be considered more important when synthesising the view. Thus also, a low confidence index, i.e. close to zero, indicates that the at least one real camera 210-1 may be considered less important when synthesising the view than another view with a lower confidence index.

According to some embodiments, the confidence index may be expressed in the inverse manner, i.e. comprising a number between one and zero, wherein a low confidence index, i.e. close to zero, indicates that the at least one real camera 210-1, or view of that at least one real camera 210-1, or part of a view of the at least one real camera 210-1 such as the texture may be considered more important when synthesising the view than another view with a higher confidence index.

A possible advantage of the confidence index may be that the decoder 230 becomes aware of, and may estimate not only when a frame of a certain real camera 210-1 may be used when synthesising the image at the virtual camera position, but also to what extend it may be used for synthesising the view. Thus the decoder 230 may receive confidence indices for a plurality of images of a plurality of real cameras 210-1, 210-2, 210-3, 210-4, and use that information for determining to what weighting factor to assign to pixels values synthesised from each of the images of the plurality of real cameras 210-1, 210-2, 210-3, 210-4 may be used for synthesising the image at the virtual camera position. Thereby, an improved view synthesising may be made by the decoder 230/view renderer/synthesiser.

Action 905

This action may be performed within some, but not necessarily all embodiments.

The image of the virtual camera position may be synthesised, based on the data representing the view of the at least one real camera 210-1. Thus, when the virtual camera position is inside the range, the view may be synthesised.

According to some embodiments, the synthesising of the image of the virtual camera position may be based on the received common view synthesis range for the set of multiple views of the set of real cameras 210-1, 210-2, 210-3, 210-4.

In some embodiments, wherein the action 904 has been performed, the image may be synthesised based on the received 904 confidence index.

Otherwise, when it has been determined 903 that the selected 902 virtual camera position is not situated within the received 901 spatial validity range, the image of the virtual camera position may not be synthesised according to some embodiments. Further, another virtual camera position inside the range may be chosen for the view synthesis instead of the firstly selected one, in some embodiments.

Figure 10A:
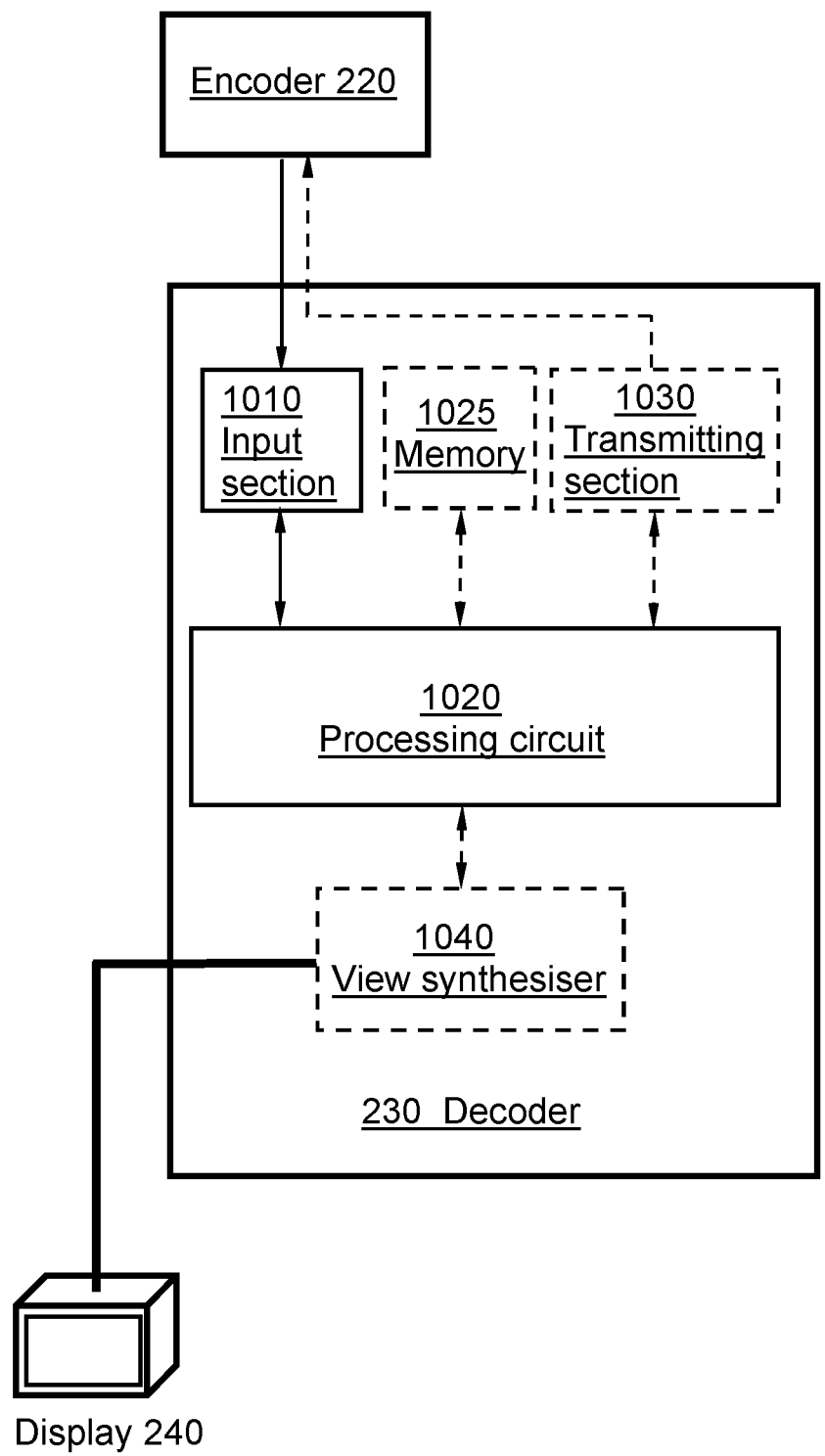
FIG. 10A is a block diagram illustrating an embodiment of a decoder.

FIG. 10A schematically depicts an embodiment of a decoder 230 configured to perform the above described actions 901-905. The decoder 230 aims at receiving information from an encoder 220 concerning a spatial validity range, in order to enable view synthesis of an image at a virtual camera position, based on a view of at least one real camera 210-1. The at least one real camera 210-1 is comprised in a set of real cameras 210-1, 210-2, 210-3, 210-4, e.g. comprised in a rig. The set of real cameras 210-1, 210-2, 210-3, 210-4 may comprise any number of cameras 210-1, 210-2, 210-3, 210-4, also comprising just one camera 210-1. The image to be synthesised at the virtual camera position may be a three dimensional auto stereoscopic image, or may comprise multiple images corresponding to different camera position, according to some embodiments. Thus the decoder 230 may be suitable for receiving a piece of advice from the encoder 220 about the range, i.e. spatial validity range of the virtual camera positions at which view synthesis may be performed with appropriate/acceptable image quality, i.e. a quality measurement exceeding a quality measurement threshold level.

The view of the real camera 210-1 may comprise a frame. Different parts of the frame may have different spatial validity ranges according to some embodiments.

The decoder 230 is configured for receiving data associated with the at least one real camera 210-1 from the encoder 220 over a wired or wireless connection based on any appropriate radio access technology.

To enable the decoder 230 to perform the view synthesis of the image at the virtual camera position, i.e. at any position desired by the decoder 230, by performing the actions 901-905 correctly the decoder 230 comprises an input section 1010, configured for receiving a spatial validity range of the at least one real camera 210-1 from the encoder 220. The spatial validity range specifies for the decoder 230 what information to use for synthesising the image of the virtual camera position. The spatial validity range may be comprised in a Supplementary Enhancement Information (SEI) message according to some embodiments.

Further, the decoder 230 comprises a processing circuit 1020, configured for selecting the virtual camera position. The processing circuit 1020 is also configured for determining that the selected virtual camera position is situated within the received spatial validity range.

The processing circuit 1020 may comprise e.g. one or more instances of a Central Processing Unit (CPU), a processing unit, a processor, a microprocessor, means for processing data, or other processing logic that may interpret and execute instructions. The processing circuit 1020 may further perform data processing functions for inputting, outputting, and processing of data comprising data buffering and device control functions, such as call processing control, user interface control, or the like.

For the sake of clarity, any internal electronics or other components of the decoder 230, not completely indispensable for understanding the implementation of the above described actions 901-905 comprised in the method 900 has been omitted from FIG. 10A.

The input section 1010 may be configured for receiving, from the encoder 220, a common view synthesis range for a set of multiple views of the set of real cameras 210-1, 210-2, 210-3, 210-4 according to some embodiments. Further, the processing circuit 1020 may be configured for determining that the selected virtual camera position is situated within the received common view synthesis range.

The input section 1010 may furthermore be configured for receiving information, from the encoder 220, indicating that the validity range comprises a union between the common view synthesis range for the set of multiple views of the set of real cameras 210-1, 210-2, 210-3, 210-4 and the spatial validity range of the at least one real camera 210-1, according to some embodiments.

The input section 1010 of the decoder 230 may be further configured for receiving information, from the encoder 220, indicating that the spatial validity range of the at least one real camera 210-1 may be replaced by the common view synthesis range for the set of multiple views of the set of real cameras 210-1, 210-2, 210-3, 210-4.

Also, in some embodiments, the input section 1010 may be configured for receiving data representing the view of the at least one real camera 210-1 from the encoder 220.

Furthermore, the view synthesiser 1040 may be configured for synthesising the image of the virtual camera position based on the received common view synthesis range for the set of multiple views of the set of real cameras 210-1, 210-2, 210-3, 210-4.

Additionally, the input section 1010 may be further configured for receiving the spatial validity range of the real camera 210-1, from the encoder 220, as a maximum coordinate and a minimum coordinate in a coordinate system. However, the input section 1010 may also be configured for receiving the spatial validity range of the real camera 210-1 comprising an offset from centre coordinates of the at least one real camera 210-1.

Further, the at least one view of the real camera 210-1 may in some embodiments comprise a frame, and different parts of the frame may have different spatial validity ranges.

The input section 1010 may also be further configured for receiving information indicating which hole filling methodology to be used, from the encoder 220 in some embodiments.

Further, the input section 1010 may be configured for receiving a confidence index of the at least one real camera 210-1.

The view synthesiser 1040 may also be further configured for synthesising the image of the virtual camera position further based on the received confidence index in such embodiments wherein the encoder 220 transmits a confidence index.

Further, the decoder 230 also may comprise a transmitting section 1030, configured for transmitting data to the encoder, according to some alternative embodiments. Such data may comprise e.g. signalling for identifying the respective entities, request for more data, or for receiving data at a particular format, just to mention some possible non-limiting examples.

Figure 10B:
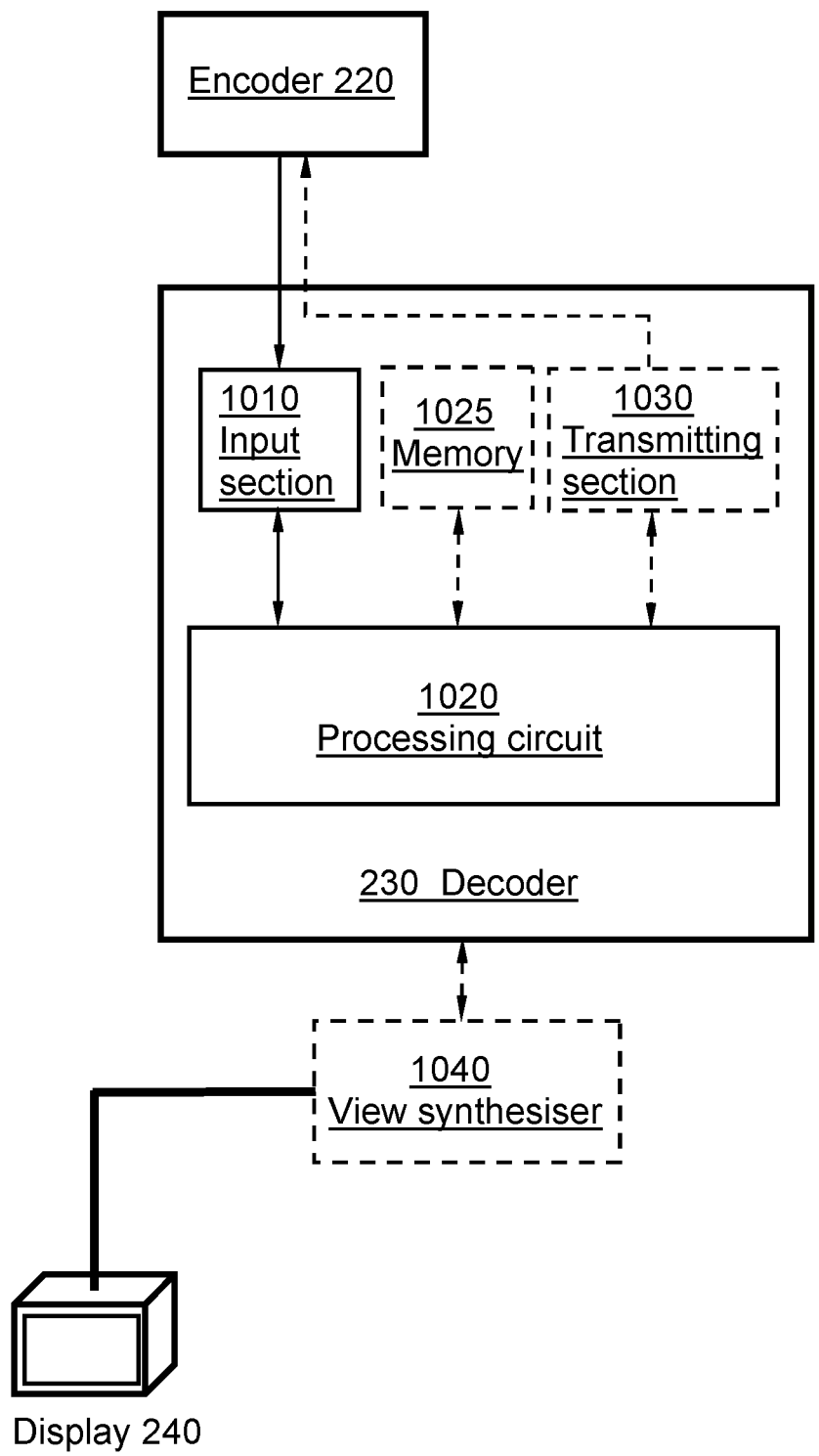
FIG. 10B is a block diagram illustrating an embodiment of a decoder.

Further, the decoder 230 may comprise a view synthesiser 1040, which may be configured for synthesising the three dimensional auto stereoscopic image of the virtual camera position or an image at a particular virtual camera position for a stereo-pair of images, based on the data representing the view of the at least one real camera 210-1, according to some embodiments. The view synthesiser 1040 may also be referred to as a view renderer. Further, the view synthesiser 1040 may be comprised within the decoder 230 in some embodiments, as illustrated in FIG. 10A. However, according to some alternative embodiments, the view synthesiser 1040 may instead be external to the decoder 230, but connected therewith over a wired or wireless connection interface. An example of such embodiment is illustrated in FIG. 10B. In those embodiments, the decoder 230 may be associated with a view synthesiser 1040 which in turn may be configured for synthesising the image of the virtual camera position.

Figure 11:
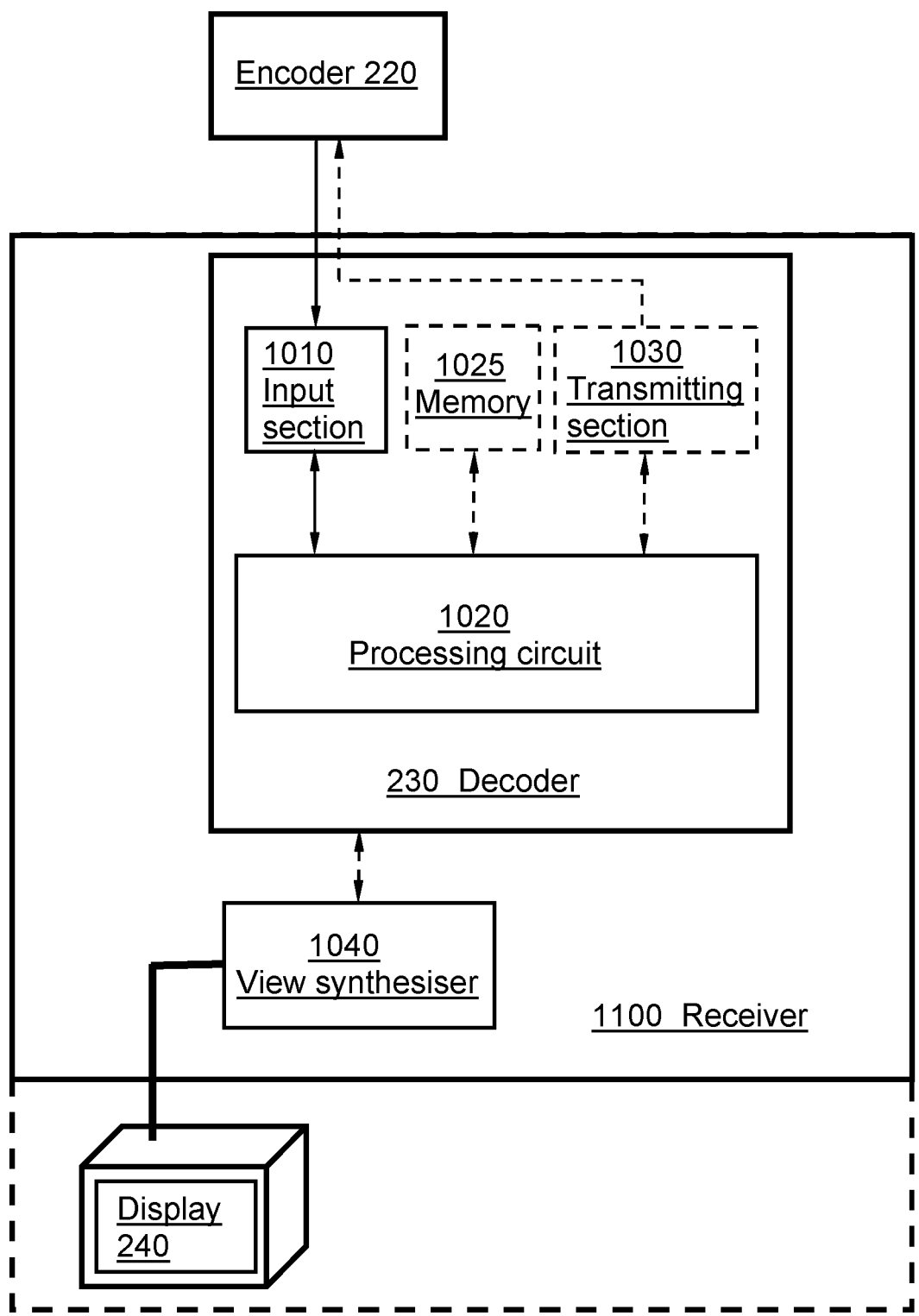
FIG. 11 is a block diagram illustrating an embodiment of a receiver.

Furthermore, according to some embodiments, the view synthesiser 1040 and/or the decoder 230 may be connected to a display 240, on which the synthesised image of the virtual camera position may be displayed. However, it may be noted that in some embodiments, the view synthesiser 1040 and/or the decoder 230 may be integrated with the display 240, such that they together form part of the same entity, or unit. Thus, the decoder 230 and the view synthesiser 1040, in some embodiments, may form part of a receiver 1100, as illustrated in FIG. 11. The receiver 1100, according to those embodiments, may thus comprise a decoder 230 e.g. as described according to embodiments above, and a view synthesiser 1040. The receiver 1100 may further be configured for generating the view synthesis of the image at the virtual camera position, based on the view of at least one real camera 210-1 comprised in the set of real cameras 210-1, 210-2, 210-3, 210-4.

In further addition, the decoder 230 also in addition may comprise at least one memory 1025. The memory 1025 may comprise a physical device utilized to store data or programs i.e. sequences of instructions, on a temporary or permanent basis. According to some embodiments, the memory 1025 may comprise integrated circuits comprising silicon-based transistors. Further, the memory 1025 may be volatile, non-volatile or comprise some units which are volatile and some units which are non-volatile, according to different embodiments.

Further, it is to be noted that some of the described units 1010-1040 comprised within the decoder 230 in at least some embodiments, are to be regarded as separate logical entities but not with necessity separate physical entities. To mention just one example, the input section 1010 and the transmitting section 1030 may be comprised or co-arranged within the same physical unit, such as e.g. a transceiver, which may comprise a transmitter circuit and a receiver circuit, which transmits outgoing radio frequency signals and receives incoming radio frequency signals, respectively, via an antenna in embodiments based on wireless transmissions. However, in some embodiments, the input section 1010 and the transmitting section 1030 may be configured for communication over a wired interface. Further, embodiments herein may comprise communication via a versatile media, such as a DVD or Blu-ray disc. According to some such embodiments, the decoder 230 may comprise a media recorder such as e.g. a DVD/Blu-ray recorder.

The actions 901-905 to be performed in the decoder 230 may be implemented through one or more processing circuits 1020 in the decoder 230, together with computer program code for performing the functions of the described actions 901-905 and/or implemented in hardware such as e.g. as an integrated circuit. Thus a computer program product, comprising instructions for performing the actions 901-905 in the decoder 230 may receive information from an encoder 220 concerning a spatial validity range, in order to enable a view synthesis of an image at a virtual camera position, based on a view of at least one real camera 210-1 comprised in a set of real cameras 210-1, 210-2, 210-3, 210-4, when being loaded into the one or more processing circuits 1020.

The computer program product mentioned above may be provided for instance in the form of a data carrier carrying computer program code for performing at least some of the actions 901-905 according to some embodiments when being loaded into the processing circuit 1020. The data carrier may be e.g. a hard disk, a CD ROM disc, a memory stick, an optical storage device, a magnetic storage device or any other appropriate medium such as a disk or tape that may hold machine readable data in a non-transitory manner. The computer program product may furthermore be provided as computer program code on a server and downloaded to the decoder 230 remotely, e.g. over an Internet or an intranet connection.

The terminology used in the detailed description of the particular exemplary embodiments illustrated in the accompanying drawings is not intended to be limiting of the described embodiments of methods 700, 900, encoder 220 and decoder 230 respectively, which instead are limited by the enclosed claims.

As used herein, the term "and/or" comprises any and all combinations of one or more of the associated listed items.

Further, as used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation. The common abbreviation "etc.", which derives from the Latin expression "et cetera" meaning "and other things" or "and so on" may have been used herein to indicate that further features, similar to the ones that have just been enumerated, exist.

As used herein, the singular forms "a", "an" and "the" are intended to comprise also the plural forms as well, unless expressly stated otherwise. It will be further understood that the terms "includes," "comprises," "including" and/or "comprising," when used in this specification, specify the presence of stated features, actions, integers, steps, operations, elements, and/or components, but do not preclude the presence or addition of one or more other features, actions, integers, steps, operations, elements, components, and/or groups thereof.

The invention claimed is:

1. A method in a decoder for receiving information from an encoder concerning spatial validity ranges at which view synthesis of an image at a virtual camera position is enabled, which view synthesis is based on a view of at least one real camera comprised in a set of real cameras, wherein the spatial validity ranges comprise coordinates, the method comprising:

receiving from the encoder, for each of at least one real camera, a spatial validity range of the real camera, which spatial validity range specifies, for the decoder, a spatial range of virtual camera positions over which image information associated with the real camera can be used for synthesizing an image for a virtual camera position, the image information comprising at least some of textures, depth maps, occlusion maps and occlusion depth;

selecting a first virtual camera position; and determining whether the selected first virtual camera position is situated within the received spatial validity range for at least one real camera, wherein view synthesis at the first virtual camera position is performable when the first virtual camera position is determined to be situated within the spatial validity range.

2. The method of claim 1, wherein the received spatial validity range of the at least one real camera comprises a common view synthesis range for a set of multiple views of the set of real cameras, and wherein the action of determining comprises determining that the selected virtual camera position is situated within the received common view synthesis range.

3. The method of claim 1, further comprising receiving information, from the encoder, indicating that the validity range comprises a union between the common view synthesis range and the spatial validity range of the at least one real camera.

4. The method of claim 1, further comprising receiving information, from the encoder, indicating that the spatial validity range of the at least one real camera is to be replaced by the common view synthesis range for the set of multiple views of the set of real cameras.

5. The method of claim 1, further comprising:

receiving data representing the view of the at least one real camera together with the received spatial validity range; and synthesizing an image for the first virtual camera position, based on the data representing the view of the at least one real camera.

6. The method of claim 5, wherein synthesizing the image for the first virtual camera position is based on the received common view synthesis range for the set of multiple views of the set of real cameras.

7. The method of claim 5, further comprising receiving a confidence index of the at least one real camera, wherein the action of synthesizing is further based on the received confidence index.

8. The method of claim 1, further comprising refraining from synthesizing an image for the first virtual camera position in response to determining that the first virtual camera position is not situated within the received spatial validity range.

9. The method of claim 8, wherein the method further comprises selecting a second virtual camera position, situated inside the received spatial validity range, and synthesizing an image for the second virtual camera position.

10. The method of claim 1, wherein the spatial validity range of the real camera is received from the encoder as a maximum coordinate and a minimum coordinate in a coordinate system.

11. The method of claim 1, wherein the at least one view of the real camera comprises a frame and wherein different parts of the frame have different spatial validity ranges.

12. The method of claim 1, wherein information indicating which hole filling methodology to be used is received from the encoder.

13. The method of claim 1, wherein the spatial validity range is comprised in a Supplementary Enhancement Information (SEI) message.

14. The method of claim 1, wherein the coordinates determining the spatial validity range of the at least one real camera comprise an offset from center coordinates of the at least one real camera.

15. The method of claim 1, wherein the decoder comprises, or is associated with, a view synthesizer wherein synthesizing images for virtual camera positions is performed.

16. A decoder for receiving information from an encoder concerning spatial validity ranges at which view synthesis of an image at a virtual camera position is enabled, which view synthesis is based on a view of at least one real camera comprised in a set of real cameras, wherein the spatial validity ranges comprise coordinates, the decoder comprising:

a receiver circuit configured to receive, from the encoder, for each of at least one real camera, a spatial validity range of the real camera, which spatial validity range specifies for the decoder, a spatial range of virtual camera positions over which image information associated with the real camera can be used for synthesizing an image for a virtual camera position, the image information comprising at least some of textures, depth maps, occlusion maps and occlusion depth;

a processing circuit configured to select a first virtual camera position and to determine whether the selected first virtual camera position is situated within the received spatial validity range, wherein view synthesis at the first virtual camera position is performable when the first virtual camera position is determined to be situated within the spatial validity range.

17. The decoder of claim 16, wherein the receiver circuit is configured to receive, from the encoder, a common view synthesis range for the set of multiple views of the set of real cameras, and the processing circuit is configured to determine that the selected virtual camera position is situated within the received common view synthesis range.

18. The decoder of claim 16, wherein the receiver circuit is further configured to receive information, from the encoder, indicating that the validity range comprises a union between the common view synthesis range and the spatial validity range of the at least one real camera.

19. The decoder of claim 16, wherein the receiver circuit is further configured to receive information, from the encoder, indicating that the spatial validity range of the at least one real camera is to be replaced by the common view synthesis range for the set of multiple views of the set of real cameras.

20. The decoder of claim 16, wherein the receiver circuit is configured to receive data representing the view of the at least one real camera from the encoder, and wherein the decoder comprises:

a view synthesizer configured to synthesize a three-dimensional auto-stereoscopic image for the first virtual camera position, based on the data representing the view of the at least one real camera.

21. The decoder of claim 20, wherein the view synthesizer is configured to synthesize the three-dimensional auto-stereoscopic image of the virtual camera position based on the received common view synthesis range for the set of multiple views of the set of real cameras.

22. The decoder of claim 16, wherein the receiver circuit is further configured to receive the spatial validity range of the real camera, from the encoder, as a maximum coordinate and a minimum coordinate in a coordinate system.

23. The decoder of claim 16, wherein the at least one view of the real camera comprises a frame and wherein different parts of the frame have different spatial validity ranges.

24. The decoder of claim 16, wherein the receiver circuit is further configured to receive information indicating which hole filling methodology to be used, from the encoder.

25. The decoder of claim 16, wherein the receiver circuit is further configured to receive a confidence index of the at least one real camera.

26. The decoder of claim 20, wherein the view synthesizer is further configured to synthesize the three-dimensional auto-stereoscopic image of the virtual camera position further based on the received confidence index.

27. The decoder of claim 16, wherein the spatial validity range is comprised in a Supplementary Enhancement Information (SEI) message.

28. The decoder of claim 16, wherein the coordinates determining the spatial validity range of the at least one real camera, comprise an offset from center coordinates of the at least one real camera.

29. The decoder of claim 16, wherein the decoder is associated with a view synthesizer configured to synthesize the image of the virtual camera position.

30. A receiver comprising a decoder of claim 16 and a view synthesiser, which receiver is configured for generating a view synthesis of an image at a virtual camera position, based on a view of at least one real camera comprised in a set of real cameras.

* * * * *